United States Patent
Busby et al.

(10) Patent No.: US 11,059,991 B2
(45) Date of Patent: *Jul. 13, 2021

(54) AIRCRAFT FLUID RESISTANT SEALANT FOR USE ON AIRCRAFT PARTS

(71) Applicant: THE PATENT WELL LLC, Fort Worth, TX (US)

(72) Inventors: Jeff Busby, Millsap, TX (US); Mike Dry, Fort Worth, TX (US); Kent Boomer, Aledo, TX (US); Matt Boyd, Fort Worth, TX (US); Chad Knight, Dodd City, TX (US); Jeb Henderson, Fort Worth, TX (US); Kelly Templin, Granbury, TX (US); Peter Sibello, Fort Worth, TX (US)

(73) Assignee: THE PATENT WELL LLC, Fort Worth, TX (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/021,391

(22) Filed: Jun. 28, 2018

(65) Prior Publication Data

US 2019/0002730 A1    Jan. 3, 2019

Related U.S. Application Data

(60) Provisional application No. 62/526,248, filed on Jun. 28, 2017.

(51) Int. Cl.
| | |
|---|---|
| C09D 175/04 | (2006.01) |
| F16J 15/10 | (2006.01) |
| B64D 45/00 | (2006.01) |
| B64D 37/32 | (2006.01) |
| H02G 15/013 | (2006.01) |
| B05B 11/00 | (2006.01) |
| B05B 7/26 | (2006.01) |
| B64F 5/10 | (2017.01) |
| B64F 5/45 | (2017.01) |
| F16J 15/14 | (2006.01) |
| B05B 7/24 | (2006.01) |
| C09D 175/02 | (2006.01) |
| B64D 37/06 | (2006.01) |
| B05B 7/04 | (2006.01) |

(52) U.S. Cl.
CPC .......... *C09D 175/04* (2013.01); *B05B 7/2472* (2013.01); *B05B 7/26* (2013.01); *B05B 11/0054* (2013.01); *B64D 37/32* (2013.01); *B64D 45/00* (2013.01); *B64F 5/10* (2017.01); *B64F 5/45* (2017.01); *F16J 15/102* (2013.01); *F16J 15/104* (2013.01); *F16J 15/14* (2013.01); *H02G 15/013* (2013.01); *B05B 7/0408* (2013.01); *B64D 37/06* (2013.01); *B64D 2045/009* (2013.01); *C08G 2190/00* (2013.01); *C09D 175/02* (2013.01)

(58) Field of Classification Search
CPC ............... C09D 175/04; C09D 175/02; C08G 2190/00; B64D 45/00; B64D 37/32; B64D 2045/009; B64D 37/06; B05B 11/0054; B05B 7/26; B05B 7/2472; B05B 7/0408; F16J 15/104; F16J 15/102; F16J 15/14; H02G 15/013

See application file for complete search history.

(56) References Cited

U.S. PATENT DOCUMENTS

| 3,182,041 A | 5/1965 | Watkins, Jr. |
|---|---|---|
| 4,613,198 A | 9/1986 | Selvin et al. |
| 5,569,050 A | 10/1996 | Lloyd |
| 5,621,043 A | 4/1997 | Croft |
| 7,229,516 B2 | 6/2007 | Busby |
| 8,579,299 B2 | 11/2013 | Zhuang et al. |
| 8,716,600 B2 | 5/2014 | Kehl et al. |
| 9,635,790 B2 | 4/2017 | Coppola et al. |
| 10,507,478 B2 * | 12/2019 | Boomer ................ B05B 7/2472 |
| 2007/0116960 A1 | 5/2007 | Nickel |
| 2007/0231047 A1 | 10/2007 | Parks et al. |
| 2009/0065236 A1 | 3/2009 | Taylor et al. |
| 2011/0011484 A1 | 1/2011 | Evoniuk et al. |
| 2011/0036947 A1 | 2/2011 | Knight |
| 2015/0065599 A1 | 3/2015 | Kralev et al. |
| 2016/0018000 A1 | 1/2016 | Busby et al. |
| 2016/0083584 A1 | 3/2016 | Meure et al. |
| 2016/0280954 A1 | 9/2016 | Walther et al. |
| 2017/0282196 A1 | 10/2017 | Boomer et al. |

OTHER PUBLICATIONS

International Search Report, PCT/US 18/40007, 12 pages dated Nov. 9, 2018.
Groe Skyflex Aerospace Materials: Sealants & Gaskets Product Options, Aircraft Sealant, www.gore.com, 4 pges Dec. 31, 2016.
Zip-Chem Aviation Products, Corrosion Inhibitors, Lubricanst, Surface Preps & Cleaners, 16 pages Dec. 31, 2012.
Axalta Coating Systems LLC, Imron Industrial Strength Ultra Low VOC Polyurethane High Gloss Topcoat (Mix Quality GN), General Industrial Technical Data Sheet, 6 pages Jan. 31, 2015.
PU Magazine, vol. 12, No. 1, Feb./Mar. 2015, Polyurethane Gels, Y. Srivastava, et al, 8 pages Feb. 28, 2015.
Eastman Aviation Solutions, Sydrol, specifically formulated to meet theh changing needs of the aviation industry, 6 pages Dec. 31, 2014.
US Department of Transportation, Federal Aviation Administration, Advisory Circular, Subject: RTCA Document DO-160 versions, D, E, F, and G, "Environmental Conditions and Test Procedures for Airborne Equipment," 16 pages Jun. 22, 2011.

(Continued)

*Primary Examiner* — Patrick D Niland

(57) ABSTRACT

A number of sealants are provided that are resistant to degradation by aircraft fluids. In some embodiments, the sealants are resistant to degradation by Jet A fluid and at least one of the three types of hydraulic fluids typically used in aircraft. These embodiments are also typically cure in place from a two part polyurethane or polyurea mix, with cure to a visibly clear coating. In some embodiments, they may be sprayed on an aircraft surface or applied by hand (brush or injectable). In other of these embodiments, the sealants comprise, at least in part, a cured, soft, tacky polyurethane gel that is resistant to at least one of a synthetic hydrocarbon based or mineral oil based hydraulic fluid.

20 Claims, 20 Drawing Sheets

(56) References Cited

OTHER PUBLICATIONS

Jet fuel, Wikipedia, en.wilipedia.org/wiki/Jet_fuel, 13 pages Sep. 11, 2017.
www.skydrol.com, Skydrol, Type IV Fire Resistant Hydraulic Fluid, LD-4/500B-4, Technical Bulletin, Pub. No. 7249153C, 28 pages Dec. 31, 2003.
The RFPDB, RFP: Antenna Gaskets for UH-60L Aircraft in Virginia, United States, 2 pages Dec. 31, 2017.
RTCA, Inc., RTCA/DO-160D, Environmental Conditions and Test Procedures for Airborne Equipment, Section 11, Fljudis Susceptibility, 6 pages Jul. 29, 1997.
Lear Chemical Research Corporation, ACF-50, anti Corrosion Formula, Product Lab Performance, 1 page Jun. 7, 2012.
Glenair, Inc., Connector Backshell Accessories, Shrink Boot Basics, 1 page Dec. 31, 2005.
Glenair, Inc., Shrink Boot Reference Information, 1 page Dec. 31, 2005.
Glenair, Inc., Series 77, Heat Shrink Boots, Adhesives Performance Properties, 2 pages Dec. 31, 2017.
Glenair, Inc., Series 77 Shrink Boots, Heat Shrink Boots, Adhesive Performance Properties, 2 pages Dec. 31, 2017.

* cited by examiner

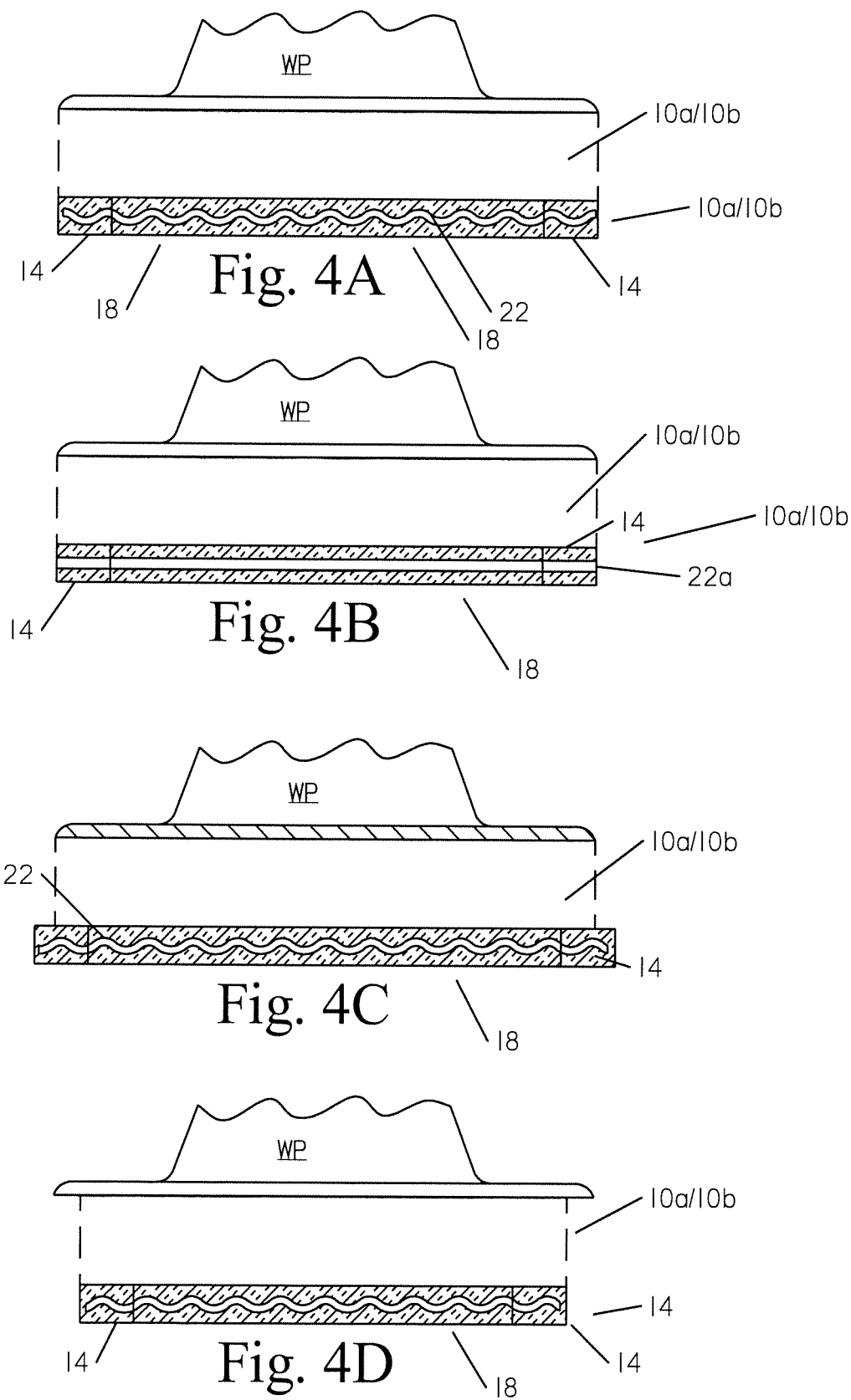

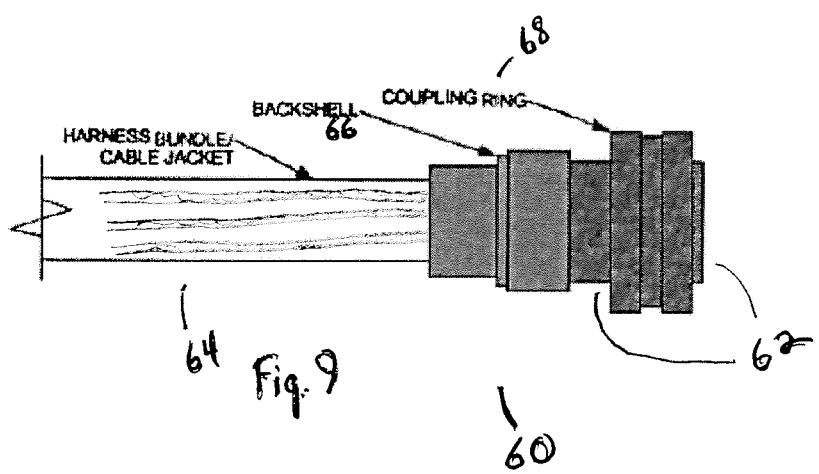

AIRCRAFT FLUID RESISTANT SEALANT FOR USE ON AIRCRAFT PARTS

This application claims the benefit of and priority to provisional application No. 62/526,248, filed Jun. 28, 2017. This application incorporates by reference US Application Publication No. 2014/0167367, published Jun. 19, 2014; Publication No. 2016/0208919, published Jul. 21, 2016, Publication No. 2015/0069722, published Mar. 12, 2015; and U.S. Pat. Nos. 6,530,577; 6,695,320; and 7,229,516. This patent also incorporates Publication No. 2017/0282196, published Oct. 5, 2017.

FIELD OF THE INVENTION

A number of sealants are provided that are resistant to degradation by aircraft fluids. In some embodiments, the sealants are resistant to degradation by Jet A fluid and at least one of the three types of hydraulic fluids typically used in aircraft. These embodiments are also typically cure in place from a two part polyurethane or polyurea mix, with cure to a visibly clear coating. In some embodiments, they may be sprayed on an aircraft surface or applied by hand (brush or injectable). In other of these embodiments, the sealants comprise, at least in part, a cured, soft, tacky polyurethane gel that is resistant to at least one of a synthetic hydrocarbon based or mineral oil based hydraulic fluid.

Sealants for aircraft parts, in some embodiments, the sealants comprising, at least in part, a two-part cured polyurethane or polyurea that is resistant to degradation from exposure to common aircraft fluids. The sealant may include a gasket or tape having a skeleton or carrier, the gasket or tape being aircraft fluid resistant. The sealant may be a sprayable sealant that is aircraft fluid resistant. The sealant may also include a sprayable sealant that is mixed and immediately applied to an aircraft surface, a surface into which it cures rapidly to form a clear sealant. The sealant may also be an injectable sealant.

BACKGROUND OF THE INVENTION

Current problems with some aircraft sealants include their inability to avoid degradation and loss of properties when exposed to certain fluids common to an aircraft. These fluids include hydraulic fluids and aircraft fuel such as Jet A fuel. Some of these fuels may not only degrade sealants, but may also be flammable, in which case, a sealant that lacks or impedes flammability is beneficial. Other problems in aircraft sealants is their long cure time when being applied at room temperature. For example, one sprayable polyurethane coating used as a sealant on an aircraft fuel tank exterior has a cure time of 7 days at 77° F., at 50% relative humidity. Some sealant applications require, or at least would benefit from, a faster cure time. Other problems with some aircraft sealants is opacity, which may prevent a visual inspection of deterioration beneath the sealant, that is deterioration of the surface onto which the sealant is applied. Other problems with sealants is that they are often not easily removable, for example, for a replacement. Sealants are sometimes too rigid, having not enough elasticity for joints in aircraft, which may require some movement. Because of the myriad of requirements for aircraft sealants, and the harsh environment to which they are typically exposed, it is not surprising that the discovery of good sealants is a difficult endeavor

SUMMARY OF THE INVENTION

A sealant is a material used for sealing something and blocking passages or contact of fluids and/or gases with a sealed surface. They may have a number of different physical and chemical properties, work in a number of different environments in different ways, and come in a number of different structures for application to a variety of aircraft parts.

A sprayable sealant is a sealant that is applied with a spray gun having a sealant bearing cartridge that emits an atomized spray comprising thousands of tiny droplets of, typically, an uncured mix that will cure on the targeted surface to form a sealant coating.

A gasket is a sealant used to seal a joint or junction typically comprising two surfaces which may be under compression.

An injectable sealant is one which is manually applied from an injector assembly typically as a thick, flowable, viscous, uncured mix which will cure to form an injected sealant coating on, in or around a surface. The injectable sealant may be a two-part mix that is mixed upon application, typically from a mixing straw of the injector assembly and may be used in potting and encapsulation of materials.

A sealant tape is a sealant that has a length and width many times its thickness and may be used as a gasket, or a sealant wrap when used to wrap around the outside of a cable or junction, such as an electrical cable or an electrical junction.

Applicant has found that removability, as measured by peel strength is an important parameter in aircraft sealant applications including those set forth in these specifications. Applicant also has found that elasticity (that is, being elastomeric) as a measure of workability is important in aircraft sealant applications. Applicant has further found that tensile strength is important for toughness, especially in the environments set forth herein. The workability, toughness, and removability are important within ranges, in some embodiments, the sealants disclosed herein are found to be within the following ranges: peel strength 1-10 piw (90° peel back, bare aluminum alloy); at least elasticity 125-200%; tensile strength greater than 100 psi (ASTM B 412 "dog bone"). The sealants disclosed herein when used as injectibles, sprayables, gaskets or tapes provide the toughness, workability and removability and also are optically clear and cure quickly at room temperature. Rapid cure means cure to about at least 85% final hardness in 24 hours or less, 77° 50% RH. Full hardness is between 20-80 Shore A. As disclosed herein, the embodiments pass a salt fog test to demonstrate their environmental resistance. Another characteristic, important for aircraft environments, is durability—the importance of maintaining these characteristics over wide temperature and pressure cycles to which aircraft are often exposed. When combined with fluid resistance as set forth herein, the sealants provide a number of improvements over prior art sealants.

The sealant may, in some embodiments, be visibly clear. Visible clarity means placing four 50 AWG tungsten wires (lengths=0.2 inch, 0.5 inch, 1 inch, 1.5 inch) on a test panel and coating the panel with the sealant about 0.040" thick. After cure, one may visually examine (assuming 20/20 vision) to determine the minimum length of wire that is visible from about 5-6 feet away under normal lab light conditions (100 to 1000 lumens). The shortest wire should be visible. Applicant's coating as set forth should pass at least this test, and passing this test refers to visible clarity or visually clear. In some embodiments, Applicant's mix may pass this test immediately upon application and through to full cure.

The sealant is preferably elastomeric (that is, elastic). Elastomeric means a 1/16"×1"×3" cured piece of sealant may be stretched to at least 130% its length and quickly recover to about its original length.

In some embodiments, applicant's sealant is resistant to at least one of a phosphate ester based hydraulic fluid, a mineral-based hydraulic fluid or a synthetic hydrocarbon based hydraulic fluid and also resistant to Jet A fuel. Jet A fuel resistance means a maximum weight change of plus or minus 1% (or in an alternate range ±4%, or in another alternate range ±8%), after 24 hours, submersion test. In the claims, Jet A fuel resistant means the broadest of these ranges unless a specific range is stated. Phosphate ester based fluid resistance means a maximum weight change of plus or minus 7% (or in an alternate range 12%, or in another alternate range 18%) over 24 hours, submersion test. In the claims, phosphate ester based hydraulic fluid resistance means the broadest of these ranges unless a specific range is stated. Mineral oil-based hydraulic and synthetic hydrocarbon-based hydraulic fluid resistance means a maximum weight change of plus or minus 1% (or in an alternate range ±5%, or in anther alternate range ±10%) after 24 hours, submersion test. In the claims, mineral oil-based and synthetic hydrocarbon based hydraulic fluid resistance means the broadest of these ranges unless a specific range is stated.

Skydrol® LD-4 is a fire resistant aircraft hydraulic fluid that is well known and used around the world. Skydrol® is a phosphate ester based hydraulic fluid. AeroShell 31 is a synthetic hydrocarbon-based hydraulic fluid (Mil-H-83282) and Mobil Aero HF is a mineral-based hydraulic fluid (Mil-H-5606). These fluids are incompatible with many adhesives and sealants.

The materials and components used in and near any aircraft hydraulic and/or fuel system are carefully selected by the aircraft manufacturer. Materials used in conjunction with hydraulic fluids and Jet A fuel should withstand exposure to these fluids with minimum swell and minimum or no loss of integrity. The term "Jet A" is intended to cover all Jet A type fuels, such as JP4, JP5, Jet A-1, and the like. Jet A fuel is manufactured to international standards.

The sealants Applicant discloses herein are not in the nature of permanent bond adhesives, rather they are sealants which allow removability. Permanent bond adhesives usually dry hard and need to be scraped off of the surfaces to which they adhere. The sealant's strength characteristics—adhesion—are less important than its flexibility and ability to withstand joint movement and maintain some adhesion sufficient to provide a moisture proof seal and corrosion resistance. Removability with toughness allows the sealant to be removed as a sheet or otherwise maintain its structural integrity when removed.

Embodiments of a sealant are disclosed for use in providing corrosion resistance on an aircraft part, the tough, removable, workable sealant comprising: a gasket having a cured polymer body comprising a non-foam, cured polyurethane and a skeleton having openings; wherein the skeleton is encapsulated in the body in an uncompressed condition; and wherein at least part of the body is aircraft fluid resistant polyurethane resistant to both Jet A and a phosphate ester hydraulic fluid. The cured polyurethane body sometimes includes a perimeter portion and a non-perimeter portion which is aircraft fluid resistant polyurethane. The non-perimeter portion may be a cured, tacky, soft polyurethane gel. The perimeter portion may be aircraft fluid resistant polyurethane.

Embodiments of a sealant are disclosed, used in a two-compartment cartridge assembly for applying a tough, removable, workable aircraft fluid resistant spray on sealant coating, the cartridge assembly for use in a pneumatic mix and spray gun, the cartridge assembly comprising: a body having a first compartment and a second compartment, the first compartment containing a first, polyol part of a sealant mix, the second compartment containing a second, isocyanate part of the sealant mix. The body is dimensioned to engage the mix and spray gun, the body also has a receiving port for receiving compressed gas to drive the mix. A mixing straw is engaged to the two compartments, and configured to receive and combine the two parts and emit the sealant mix, under pressure, from a tip at a removed end thereof to form a cure in place aircraft fluid resistant polyurethane sealant coating on a workpiece. The sealant coating may be clear up to about 250 mil thickness to see any underlying cracks in the workpiece. The sealing coating may be VOC and solvent free. The sealant coating may gel on the workpiece in under about 30 minutes. The sealant coating may reach a cured hardness (about 85% or greater of final hardness) between about 20-80 Shore "A" at 77° F. in about 24 hours or less (50% relative humidity). The sealant coating may be between about 3 to 30 mil thick on a workpiece. The viscosity of the sealant mix prior to gelling may be between about 700 and 1200 cps. The mixing straw may be disengageable from the body so as to be replaced if it clogs with gelled or cured mix. The sealant coating may be Flame Retardant under 14 CFR 25.853a, Appendix F, Part 1(A)(1)(ii) (12 second vertical burn). The sealant coating displays good cohesion to the workpiece and may be flame retardant and UV resistant.

A method is provided for coating an aircraft part with a tough, removable, workable sealant, comprising the steps of: providing a pneumatic, mix and spray gun with a mixing straw and two chambers, a first chamber having a first mix component and a separate second chamber having a second mix component, the mix and spray gun configured to mix the two components in a nozzle and emit a spray of atomized, uncured mix from a tip of the mixing nozzle; first applying to a first section of a first workpiece a first layer of uncured mix; and allowing the uncured mix to cure to form an aircraft fluid resistant polyurethane sealant coating.

Embodiments of a sealant are disclosed wherein a cartridge assembly is provided for manually injecting a tough, removable, workable aircraft fluid resistant injectable sealant on an aircraft surface. The cartridge assembly includes a body having a first compartment and a second compartment, the first compartment containing a resin and the second compartment, a hardener. A forcing element for engages the two compartments. A mixing straw engaging the body and two compartments. The mixing straw has a tip for emitting an uncured sealant mix when force is applied to the forcing element. The uncured mix will cure to a sealant which is resistant at least one of a phosphate ester based hydraulic fluid or a synthetic hydrocarbon based hydraulic fluid and also resistant to Jet A fuel.

Embodiments of a sealant are disclosed, namely, a tape is provided for use as a tough, removable, workable, aircraft fluid resistant sealant. The tape may comprise a stretchable foam carrier and a cured, non-adhesive polymer body some of which is in contact with the carrier and on an outer surface thereof, the cured, non-adhesive polymer sealant being fluid resistant to at least one of a phosphate ester based hydraulic fluid or a synthetic hydrocarbon based hydraulic fluid and also resistant to Jet A fuel. The polymer body of the tape, unlike the TS1228 and SF2470 sealants (cure in place dry to touch) is soft and tacky to the touch when cured.

BRIEF DESCRIPTION OF THE DRAWINGS

FIGS. 4A, 4B, 4C, 4D, 4E, and 4F illustrate various configurations of a gasket which uses Applicant's aircraft fluid resistant polyurethane sealant as all or a part thereof, in a straight cut (FIGS. 4A and 4B) overcut (FIG. 4C) undercut) (FIG. 4D) configuration, with FIGS. 4E and 4F showing an outer perimeter and gasket subject to compression between a workpiece and a base.

FIG. 9 illustrates a sealant for use with a backshell for connecting a cable to a connector.

DETAILED DESCRIPTION OF THE EMBODIMENTS

Applicant provides a two-part, polyurethane aircraft fluid resistant sealant, such as a gasket, tape, spray sealant, or injectable sealant, used at least in part, to make a sealant on aircraft parts. Applicant's sealant may be provided, in some embodiments, by use of TS1228 (available from KBS Chemical, Dodd City, Tex.) a two-part polyurethane that, when mixed, cures to form a watertight, tough, workable, durable elastomeric seal and may be used as all or part of a sealant on an aircraft part assembly, in some embodiments, a gasket, tape, injectable, or a sprayable sealant.

The TS1228 polyurethane sealant was tested in accordance with RTCA DO-160G Section 11, Fluids spray and submersion susceptibility to simulate accelerated real world application scenarios. All testing was performed at room temperature and only applicable fluids were tested (see Tables 1 and 2).

Figure 1:
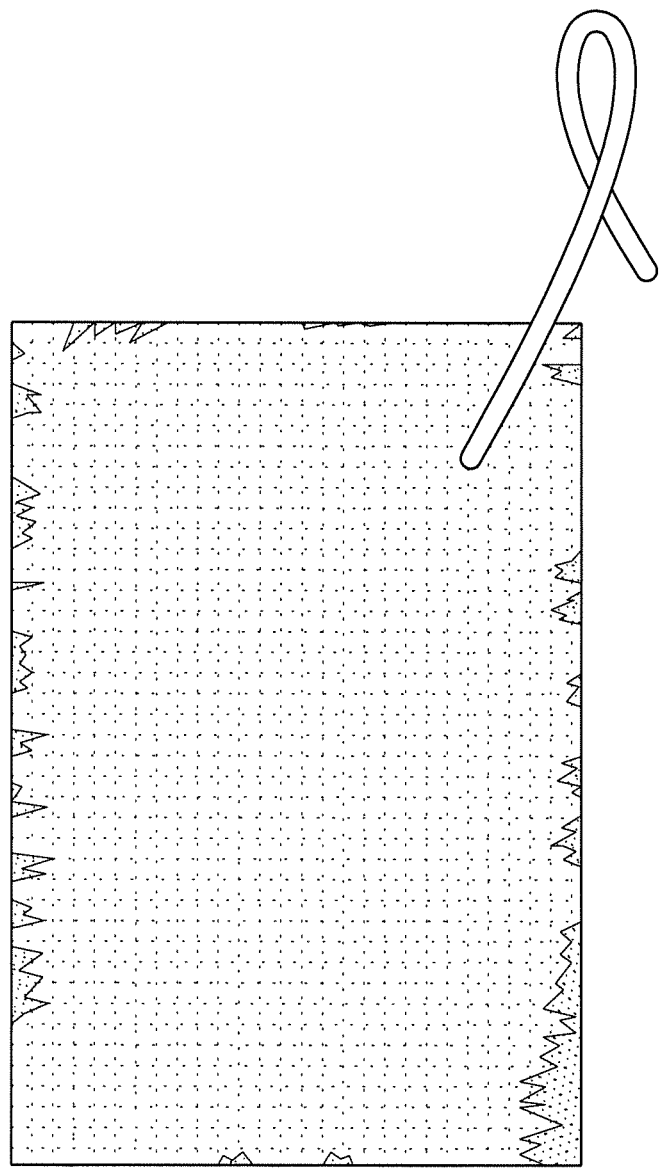
FIGS. 1 and 2 show a block of cured TS1228 aircraft fluid resistant sealant before testing as set forth herein.
Figure 1A:
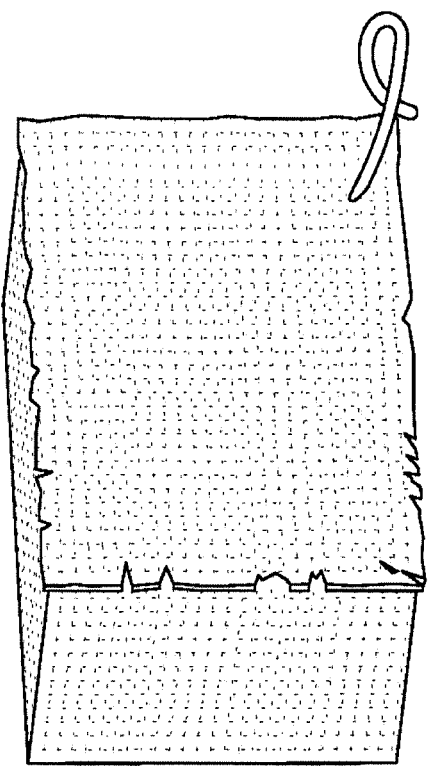
FIGS. 1A and 1B show fluid spray test results for Jet A and Skydrol®, respectively.
Figure 1B:
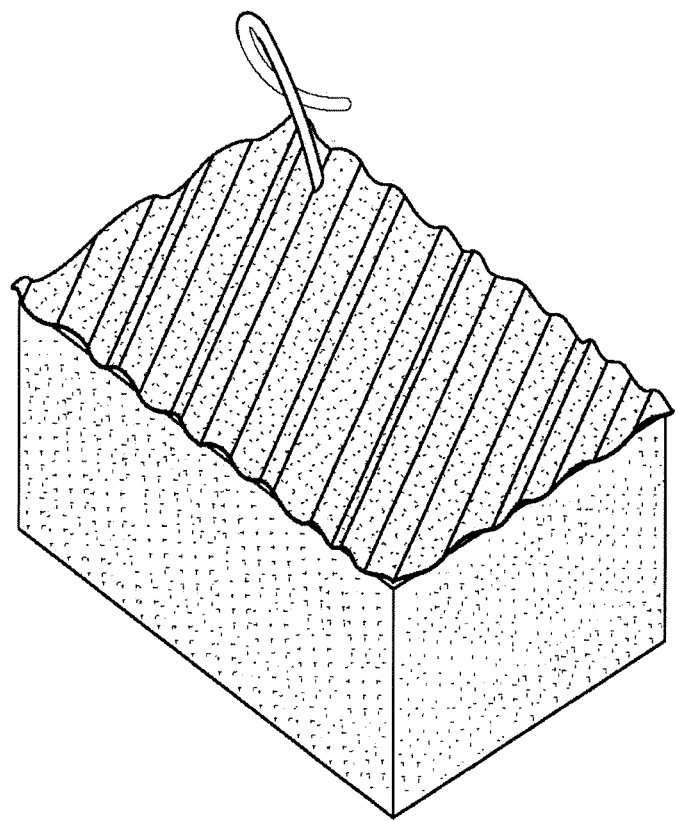
Figure 2:
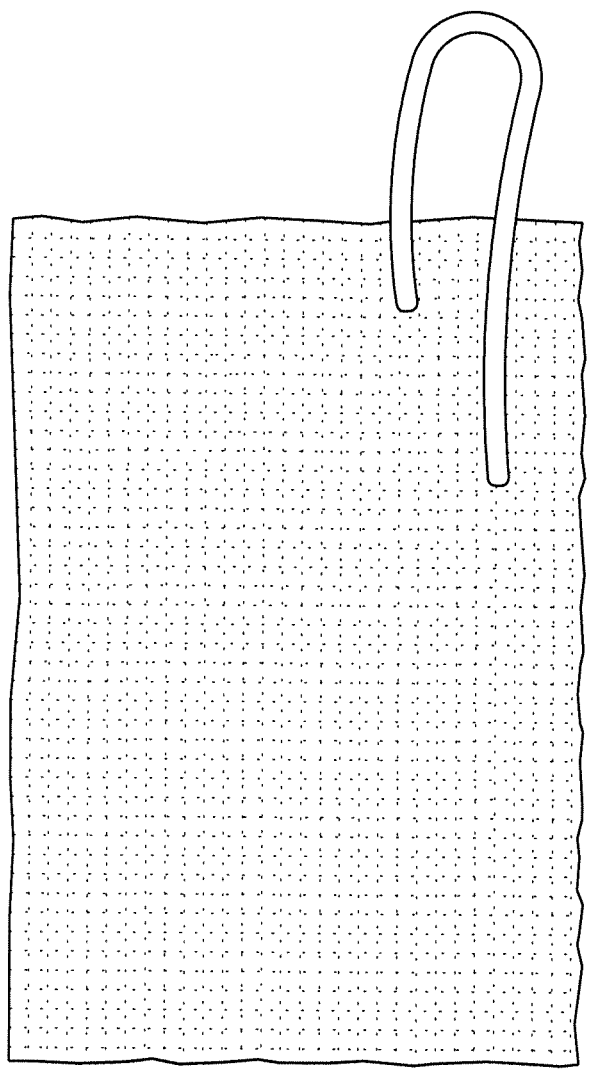

FIGS. 1 and 2 illustrate test specimens pre-immersion and pre-spray. FIG. 1A illustrates submersion results for a body comprised 100% of cured TS1228 after 168 hrs. in Jet A, visual inspection showing no change dimensionally and a 2% weight gain (see Table 1). Weight gain after 24 hours was 1%. The same material, TS1228 is illustrated in FIG. 1B after 168 hrs. of submersion in Skydrol LD-4, a phosphate ester based aircraft hydraulic fluid. An increase in weight of about 7% after 24 hours (19 percent after 168 hrs) in Skydrol LD-4 is observed. Both results are believed to be appreciably better than comparable products. (Table 1, for submersion test results and after 24 and 168 hrs. for a total of 16 different liquids, including Jet A, Skydrol® LD-4, and Mobil Aero HF.)

Submersion testing involves placing the sealant samples in a glass basin and completely submerging them in the fluid at room temperature and ambient air pressure. The samples are removed after 24 hrs. of exposure, air dry for 24 hrs., visually inspected, examined and weighed. They are then placed back in the fluid until a total of 168 hrs. of exposure is complete, then air dried, visually inspected, examined, and weighed.

Figure 2A:
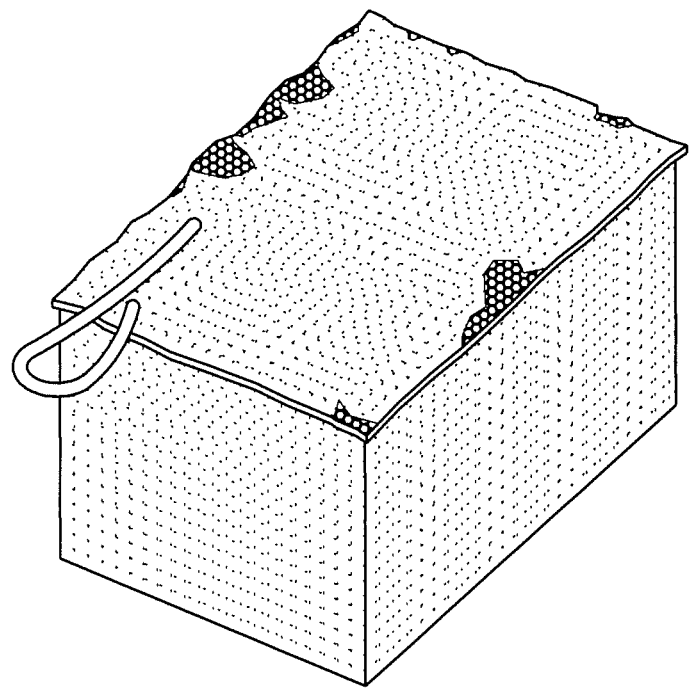
FIGS. 2A and 2B show submersion test results for Jet A and Skydrol®, respectively, for the cured polyurethane aircraft fluid resistant sealant.
Figure 2B:
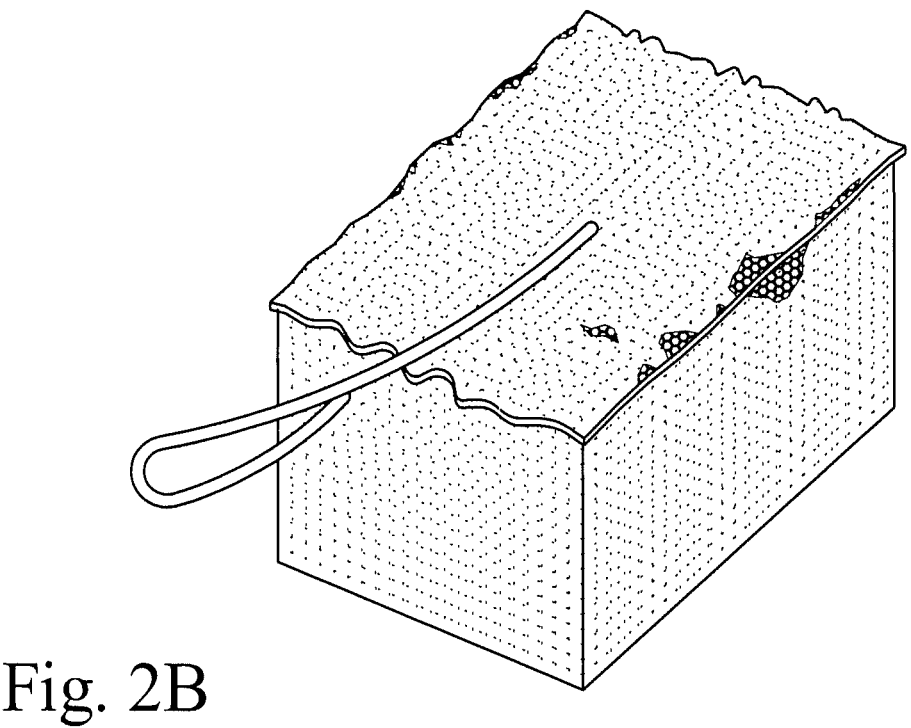

TS1228 was also tested for aircraft fluid spray exposure and FIGS. 2A and 2B illustrate TS1228 after 24 hrs. of spray in Jet A fuel (FIG. 2A), Skydrol LD-4 (FIG. 2B). FIG. 2 shows the test assembly pre-testing. After 8/16/24 hours of spray, Jet A fuel showed the following weight change: 0.08%/0.06%/0.07%. Visible inspection and examination showed no physical deterioration. FIG. 2B shows Skydrol LD-4 after 24 hrs. The 8/16/24 hr. weight change is 65%/1.02%/1.66%, visible inspection and examination showing no physical deterioration. Table 2 attached shows seventeen fluids tested and results.

Applicants' SF2470 (KBS, Dodd City, Tex.) is a two-part polyurea cure in place sealant with workability, removability, toughness and durability. Where the dry to touch time of TS1228 is 15-30 min. at 77° F., SF2470 is 8-20 min. Dry through means a 6 pound thumb press and 90° turn at 77° F. does not leave a permanent impression. Dry through time for TS1228 is 3-6 hours and SF2470 is 1-2 hours.

Test Specimens—Both Spray and Submersion

Material under test—Av-DEC® TS1228 Injectable Sealant, as cured, measuring approximately 1.8"×1.1"×0.9" with an embedded wire Test Assembly—Both Spray and Submersion A length of wire sufficient to hang specimen from rack was cut, measured and the mass was recorded. The material was injected into a "Peel-A-Way" disposable mold (R-40). The wire was embedded into the sealant. The specimens prepared for testing were allowed to cure for a period of 24 hours and then were removed from the mold. The mass of each test assembly was measured and recorded.

Applicants' cured sealants have a hardness (Shore A 50-60 in one range, Shore A 20 to 80 in another), elasticity (meaning elastomeric), moisture proof ability (observed and salt fog test), thermal range (−85° F. to 275° F.) and ability to withstand thermal and pressure cycling, either as a sprayable on the surface of an aircraft part, an injectable or on a gasket between facing surfaces under compression, or tape.

Applicant's sealant is also flame retardant under 14 CFR 25.853(a), Appendix F, Part 1(A)(1)(ii) (12 second vertical burn). It is amber, VOC-free, solvent-free, and visually clear in coating up to about ¼" to ½". Moreover, it is UV resistant, being exposed to over 5,000 hours of UV light without degradation.

Applicant's aircraft fluid resistant polymer sealant has a first part, resin which may have, at about 77° F. of viscosity between 70 to 250 cps, and a second part, such as a hardener, which may have at 77° F. viscosity of about 600 to 1200 cps. The gel time of a 10 gram mass at about 77° F. is less than about 15 mins. and it reaches full cure at about 8 to 24 hours. Thus, it may be termed fast curing. It has a working life after mixing of about ten minutes or less. It has a shelf life in original packaging and use within 24 hours after opening, of about nine months. It may, in some embodiments, have a peel strength of about 4.92 lbs. per inch width (4-6 in one range and 2-10 in another range), a tensile strength (ASTMD 412) of about 260 psi (or greater than 100 psi) and, in testing as an injectable, shows no corrosion present after 3000 hrs. salt fog (ASTMB 117). Peel strength is measured on a clean, dry surface of aluminum 6061/alloy with a cured ⅛" thick layer, 90° peel slow, constant speed. When used as disclosed herein, it should retain its physical and chemical properties with no or minimal loss in functional properties.

Figure 3:
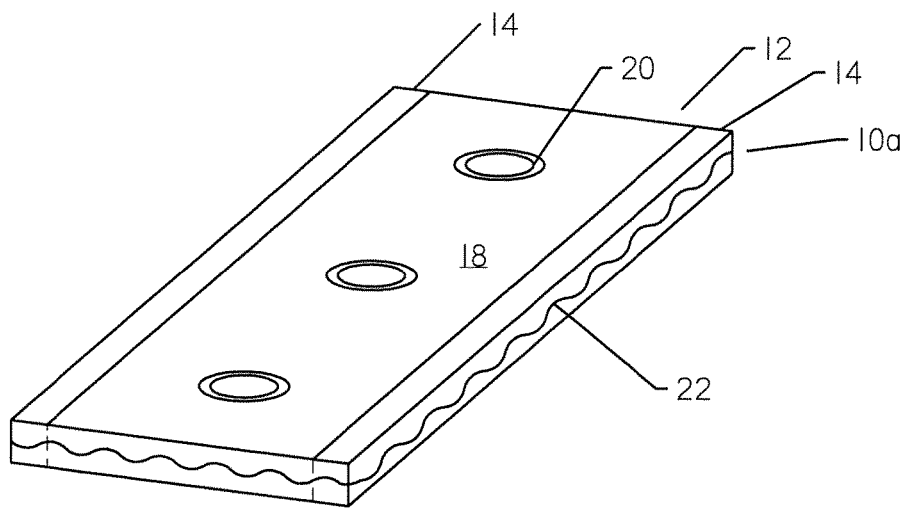
FIG. 3 is a perspective view cutaway of a gasket using at least in part Applicant's aircraft fluid resistant polymer as part of a body thereof.
Figure 4:
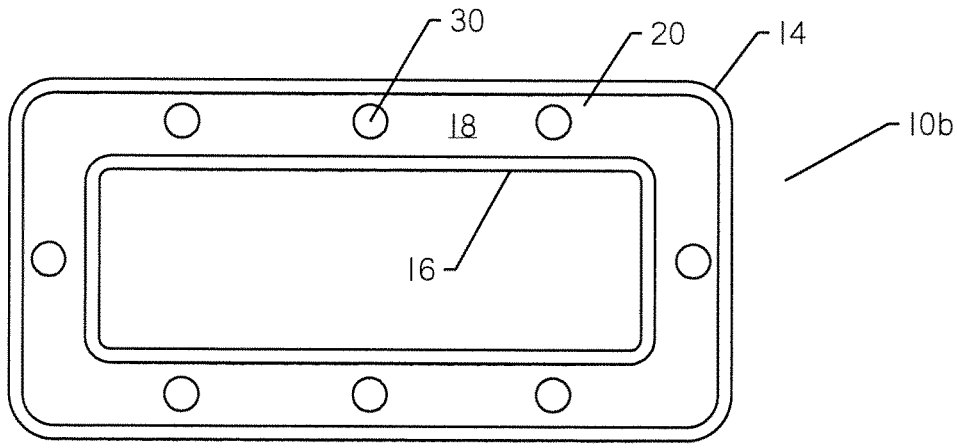
FIG. 4 illustrates a view of a gasket in which Applicant's aircraft fluid resistant polymer is used, in a top view showing an inner and outer perimeter and fastener perimeters in a non-perimeter portion.

FIG. 3 illustrates the use of Applicant's aircraft fluid resistant sealant in a gasket 10a with a body 12 and a skeleton 22. FIGS. 3 and 4 illustrate a gasket 10a/10b with body 12. Body 12 may include an outer perimeter 14 and an inner perimeter 16 (gasket 10b, FIG. 4), in some embodiments, fastener perimeters 20, as well as a non-perimeter portion 18. Gaskets 10a/10b may also include a skeleton 22, which has openings, and may be flat, and is typically encapsulated. All or part of body 12, including 14/16/18/20, may be made from any of Applicant's aircraft fluid resistant sealant. In some embodiments, non-perimeter portion 18 is a soft, tacky gel as described in U.S. Pat. No. 7,229,516, and one or more of 14/16/20 may be Applicant's fluid resistant polymers. In other embodiments, it is the soft, tacky aircraft fluid resistant gel as set forth below in FIG. 10.

Applicant's aircraft fluid resistant sealants TS1228, SF2470 or U1020/P1021 may be used to comprise any part or all of gasket body 12/14/16/18/20 and the rest of the body (if any) may be a polyurethane gel as set forth in U.S. Pat. Nos. 6,530,577 6,695,320; and 7,229,516, incorporated herein by reference. There may be no perimeter portions when the entire body is comprised of TS1228, for example.

Any gasket comprising at least in part body 12 may be made according to the methods described in the foregoing patents. When perimeter parts are made from Applicant's aircraft fluid resistant sealant, they may be made according to US Publication No. 2014/0167367, incorporated herein by reference.

Figure 5:
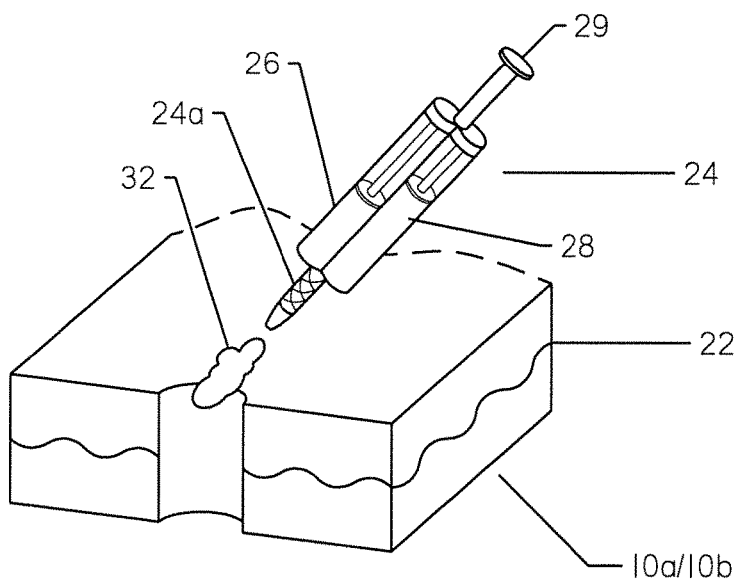
FIG. 5 shows an injection assembly having two compartments for use with Applicant's two component aircraft fluid resistant mix, illustrated making a cure in place wet seal.

FIG. 5 shows a use of the aircraft fluid resistant sealant being used as part of an injectable assembly 24, which includes two compartments 26/28, in some embodiments, one part for polyol and one part for isocyanate, the two parts being, in some embodiments, approximately a 2 to 1 volume ratio. The assembly is shown being used to apply a wet (uncured) seal around fastener holes 30. Injectable assembly 24 may have a forcing element 29 acting on the two separate compartments and forcing each to mix in through a mixing straw or nozzle 24a, from which they will emerge as a viscous liquid to cure in place on the gasket or aircraft part. A gasket made at least in part by Applicant's aircraft fluid resistant sealant may have either a fastener perimeter 20 cured in place during the manufacturing process of the gasket, or fastener holes or perimeters 30 may be left without a perimeter and may use a wet seal about the fastener holes when installed on an aircraft. The wet seal may include an uncured polyurethane TS1228 mix 32 injected when the gasket 10a/10b is placed on the workpiece and just before the fasteners are inserted through holes 30. The uncured mix cures to form a tough, aircraft fluid resistant polyurethane seal around the fastener and helps prevent corrosion while maintaining an environmental seal. More generally, TS1228 or SF2470 may be used as a cure-in-place injectable in any void or space on an aircraft where fluid resistance is needed and flame retardant is helpful also. In other embodiments, gaskets may be made with U1020/P1021 where tackiness and softness is needed along with fluid resistance.

Figure 4E:
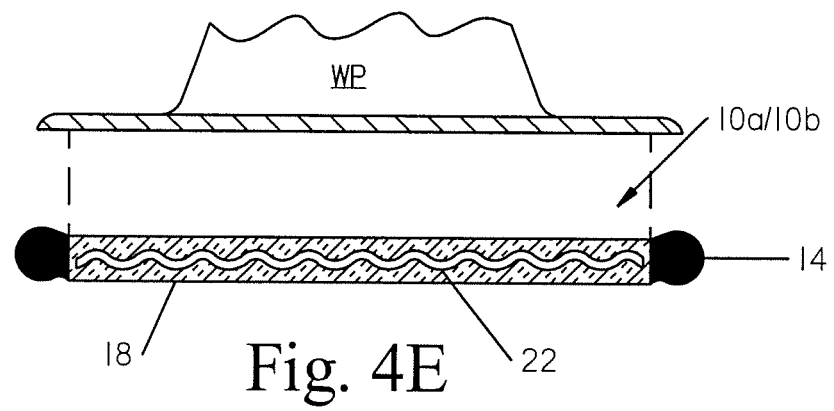
Figure 4F:
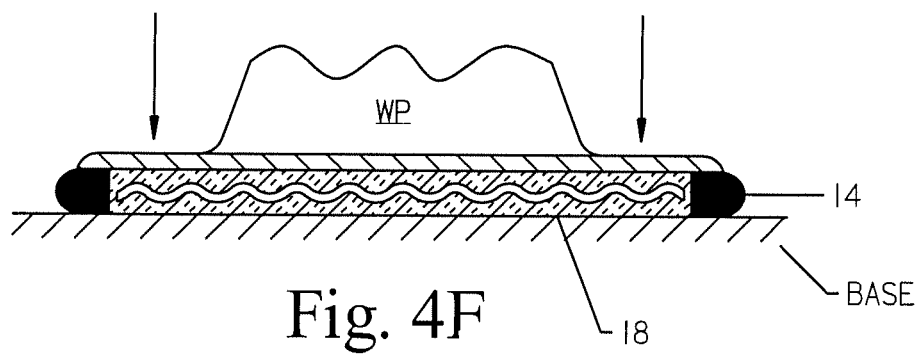

FIGS. 4A, 4B, 4C, and 4D illustrate Applicant's at least partially fluid resistant gaskets 10a/10b used between a base and a workpiece, which base and workpiece typically have generally parallel surfaces and place the gasket, all or part, under compression therebetween. In these illustrations, the gasket is seen to have a non-perimeter portion 18 and an outer perimeter portion 14. (the gasket may also have a fastener perimeter 20 and/or an inner perimeter 16). In FIG. 4A, it is seen that the gasket may be die cut such that the outer perimeter of the gasket lies about even with the edge of the workpiece (the base is shown in FIG. 4F only). In this Figure, the skeleton 22 is a woven or mesh material, flexible. This is considered "straight cut" and compression will be applied to the entire gasket body, including the outer perimeter when fasteners or the like are used. FIG. 4B shows that a skeleton 22a may be a non-woven or non-mesh material like an impervious sheet. In FIG. 4C, it is seen that the gasket is made slightly larger (for example, about 2 mil to 750 mil or about 30 to 400 mil) so that the outer (or inner) perimeter extends beyond the edges of the workpiece in a pre-compressed state. FIG. 4C can be considered an overcut gasket. FIG. 4D is an undercut gasket where the gasket is cut slightly smaller (for example, about 2 mil to 750 mil or about 30 to 400 mil) at the outer perimeter than the outer perimeter of the workpiece. In FIG. 4E it is seen that a straight cut, under cut or overcut, may create an aircraft fuel resistant perimeter 14/16/20 (inner, outer or fastener), sealing completely around the workpiece WP, protecting a non-perimeter portion 18 that may or may not be a fluid resistant polymer or a tacky polyurethane gel. It is noted that the use of all perimeters 14/16/20 or some perimeters may provide for an entire gasket when under compression that is fluid resistant even when non-perimeter portion 18 may not be. That is, perimeters 14/16/20 may be configured such that, after compression, the only exposed portion of the gasket body is comprised of aircraft fluid resistant sealant.

Figure 4G:
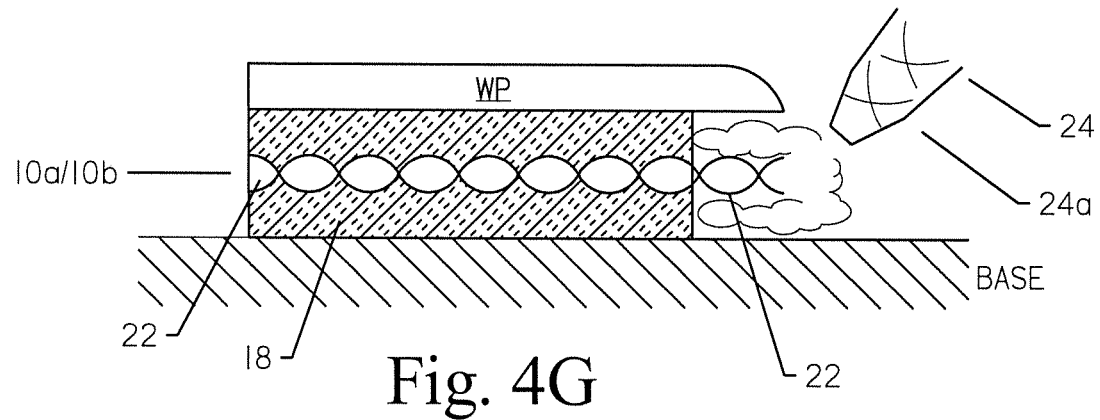
FIGS. 4G and 4H show the method of making and use of a fuel resistant perimeter encapsulating a mesh.
Figure 4H:
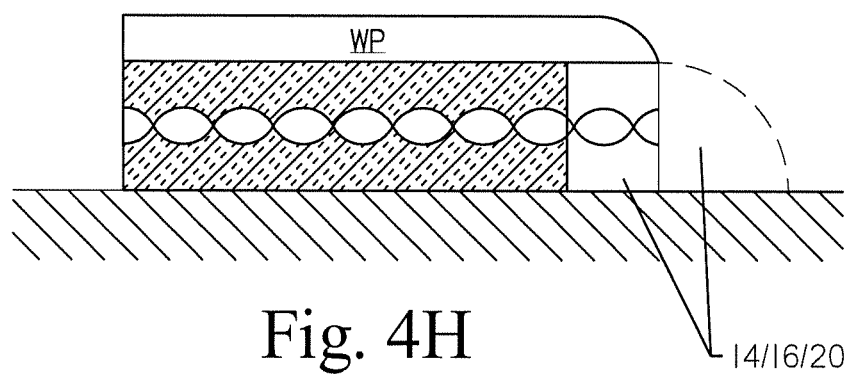

FIGS. 4E and 4F show a perimeter portion 14, which may be an aircraft fluid resistant sealant, which does not physically encapsulate and cure around the skeleton 22/22a as seen, for example, in FIGS. 4A, 4B, 4C, and 4D, and in FIGS. 4G and 4H. FIGS. 4E and 4F show the body 12 undercut such that under compression as seen in FIG. 4F, the outer edge of 14 is about aligned with the outer edge of the workpiece or bulges out. In FIGS. 4E and 4F, the portion of the gasket body shown in the Figures may be added at or about the time (or anytime) the workpiece is connected to the base by using an injectable assembly 24 with a mixing nozzle 24a.

In FIGS. 4G and 4H, a perimeter 14/16/20 is provided to a gasket having a non-perimeter portion 18, which perimeter may be fluid resistant sealant and may be created by manufacturing a gasket with a portion of skeleton 22 extending beyond non-perimeter portion 18. In other words, a gasket with a skeletal perimeter initially sticking out beyond the body. Then, at the worksite when a gasket is placed between the workpiece and the base, a perimeter may be applied as illustrated in FIG. 4G with an uncured mix injected, poured or otherwise applied along the edge so it contacts and cures at least on that portion of the skeleton extending beyond the non-perimeter portion 18. Applicant's aircraft fluid resistant sealant cures fairly quickly, typically less than about 30 minutes and, in some cases, less than 15 minutes, and at the worksite (after applying the uncured mix and before it cures), one can use a tool straightedge or shaped tool to provide a straight cut as seen in FIG. 4H, solid line extending down from the perimeter of the workpiece to the base. Or, a shaped tool may be used to provide a fuel resistant perimeter with a shape that extends outward, shown by the dash line in FIG. 4H. It is to be noted that at least some of the embodiments of the gasket set forth herein may include a body being at least partially tacky, such as a body made at least in part by the tacky gel disclosed in U.S. Pat. No. 7,229,516, or U1020/P1021 (fluid resistant). Moreover, the aircraft fluid resistant body may have some tackiness, including for example, by applying to a surface thereof after cure, a thin veneer, such as about 1 to 10 mil, of the tacky gels disclosed in U.S. Pat. No. 7,229,516.

Although the gasket depicted in FIG. 4 as having a basic polygonal shape for sealing around a simple flange or against mating surfaces that surround an opening, it will be appreciated that the gasket is not limited to this or any other shape. Indeed, the gasket can be manufactured in a variety of shapes, sizes, and configurations. Woven fibers of the skeleton can be selected from a variety of fibers, including but not limited to, fiberglass fibers, carbon fibers, aramid fibers, cotton fibers, and polyester fibers. It is to be appreciated that other types of woven sheets having strands of threads in bundled fibers woven together in a variety of perpendicular and non-perpendicular, symmetrical or non-symmetrical patterns are possible.

Figure 6:
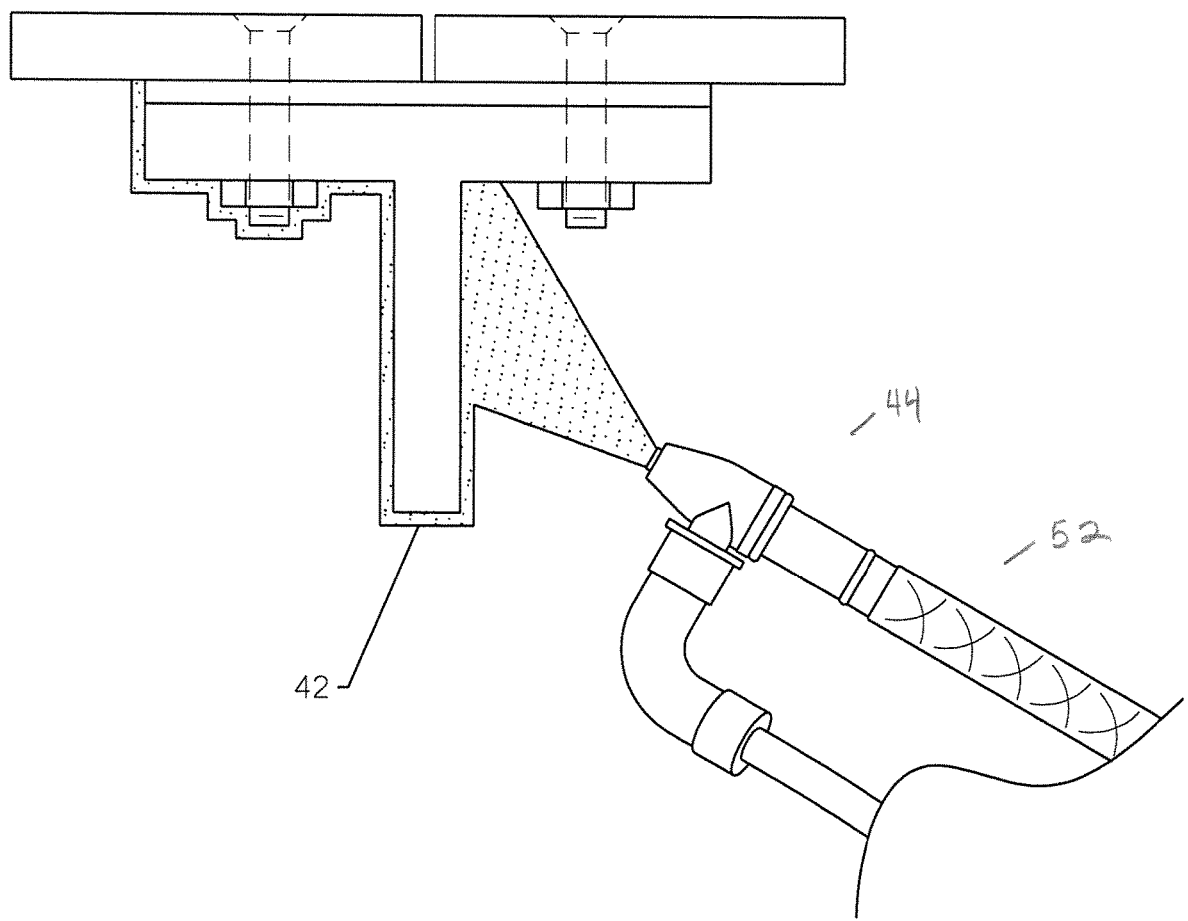
FIG. 6 illustrates, when viewed in conjunction with FIG. 8, a cartridge assembly for use with a pneumatic spray gun for applying a two-part aircraft fluid resistant polyurethane coating to an aircraft part.
Figure 8:
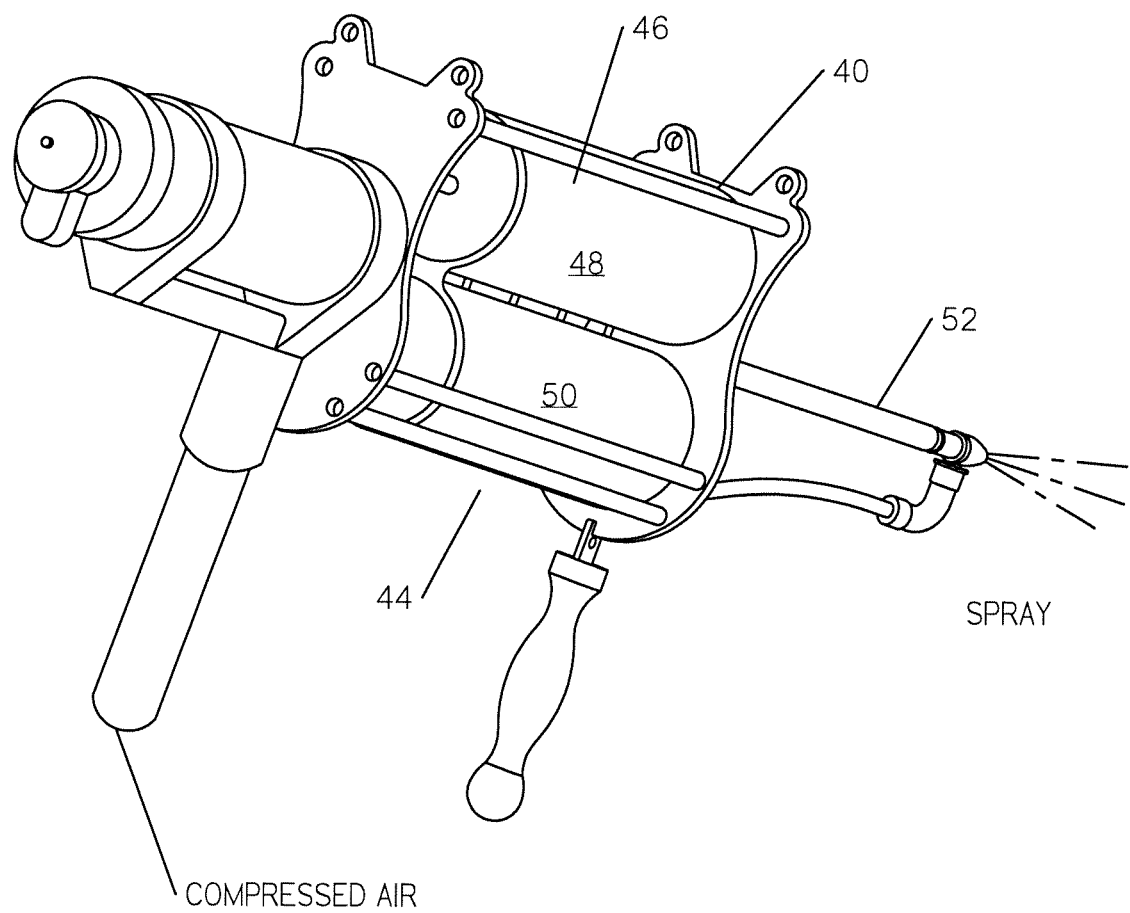
FIG. 8 illustrates a side view of a spray gun and cartridge assembly for applying Applicant's sprayable aircraft fluid resistant polyurethane coating to an aircraft part.

FIGS. 5, 6, and 8 illustrate uses of Applicant's aircraft fluid resistant sealant as a two-part polymer sprayable (mix and spray simultaneously), which has, when cured, aircraft fluid resistant properties. The sealant is for spraying on aircraft parts to provide a tough, durable, workable and removable, sprayed on sealant coat. It has been found that a cartridge assembly 40 may be used for applying a two-part polymer sealant coating which results in a tough, visibly clear aircraft fluid resistant, sprayed on polymer sealant coat 42, the cartridge assembly with two parts used with a pneumatic mix and spray gun 44. Cartridge assembly 48 may have body 46 comprising a first compartment 48 and a second compartment 50. The first compartment may contain a first part of the two-part polyurethane or polyurea mix, for example, a polyol and the second compartment 50 may include a second part, such as an isocyanate. The polyol and isocyanate typically combine and mix in a nozzle 52 and are emitted as a spray. In one embodiment, a two part polyol to one part isocyanate ratio by volume is used. The spray may be sprayed on any aircraft workpiece, including the exterior and/or interior of hydraulic fittings, joints, surfaces, fuel fittings, tanks or surfaces, galleys, floors, cargo bays, and the like. Applicants' sealant may be applied to vertical aluminum alloy surfaces (sprayed on in some embodiments with Sulzer Mixpac MixCoat Spray Gun) in one embodiment, modified with compressed gas port on tip of nozzle 52 of the mixing straw to break up the mix into small particles. Typically HVLP dispensers or air spray guns will not be used, rather airless or air assisted spray equipment may be used. For more details regarding the use of a clear sprayable sealant and its optical properties (see '196 publication, incorporated herein by reference).

Figure 7:
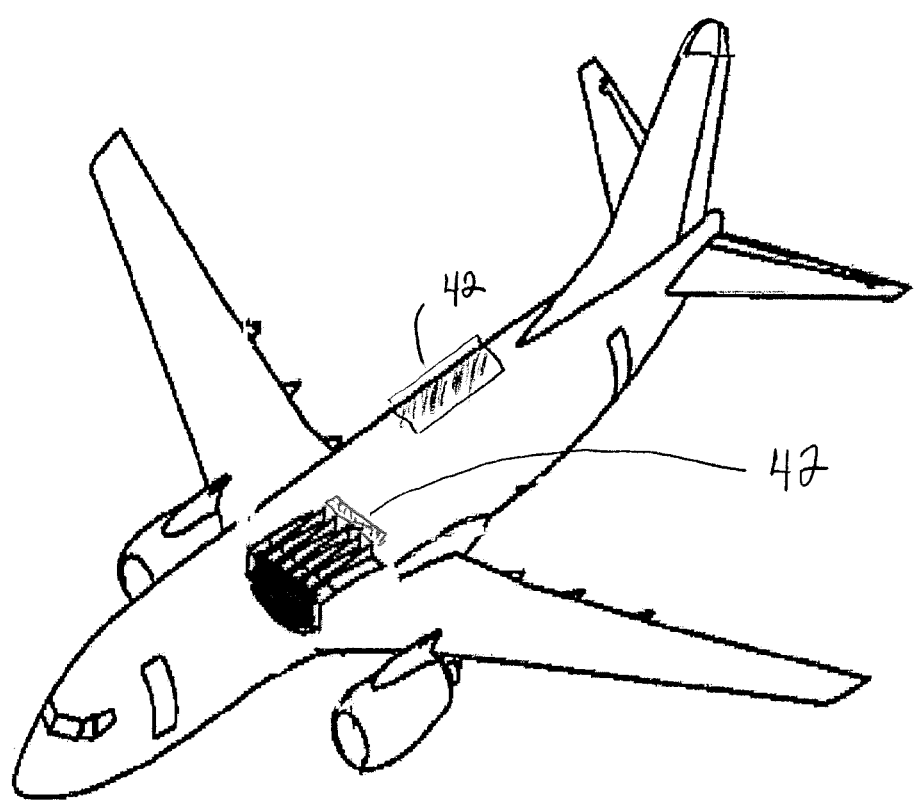
FIG. 7 illustrates one environment for use with Applicant's aircraft fluid resistant polyurethane sprayable coating; namely, an exterior surface of an aircraft fuel tank.

FIG. 7 illustrates two additional uses of applicants' sprayed on sealant coat 42. First, on the surface-outer or inner, of the fuselage of an aircraft. The second, as a secondary fuel barrier on aircraft fuel tanks such as the center wing box tank illustrated. Embodiments of a clear sprayable sealant for aircraft exteriors may have peel strengths of 25-30 piw and are flame retardant, per 12 second vertical burn.

Applicant's TS1228 or SF2470 sealant, whether used as an injectable, sprayable, gasket or tape, may be used in a thickness of about 3 to 60 mil in one range or about 10 to 50 mil in another range or up to ½" in a third range and, in these ranges, and has sufficient clarity to see cracks (for example, when used as a sprayable) in the underlying aircraft part, while still being resistant to Jet A fuel and Skydrol as set forth herein.

Applicant's aircraft fluid resistant polyurethane sealant is VOC and solvent-free. It displays good cohesion, when sprayed on or applied in an uncured condition, to a metallic or non-metallic surface. It displays good cohesion to a knitted or woven mesh, metallic or non-metallic of a gasket when used as part of a gasket body. A gasket made at least in part of Applicant's aircraft fluid resistant sealant work well for corrosion resistance on an aircraft workpiece comprised of an aluminum alloy. Applicant's sealant, in an uncured but mixed condition, may have a viscosity typically between about 700 and 1200 cps, allowing it to be sprayed or injected and poured pursuant to methods found in U.S. Pat. No. 9,701,388, and the other documents incorporated herein by reference.

Figure 9A:
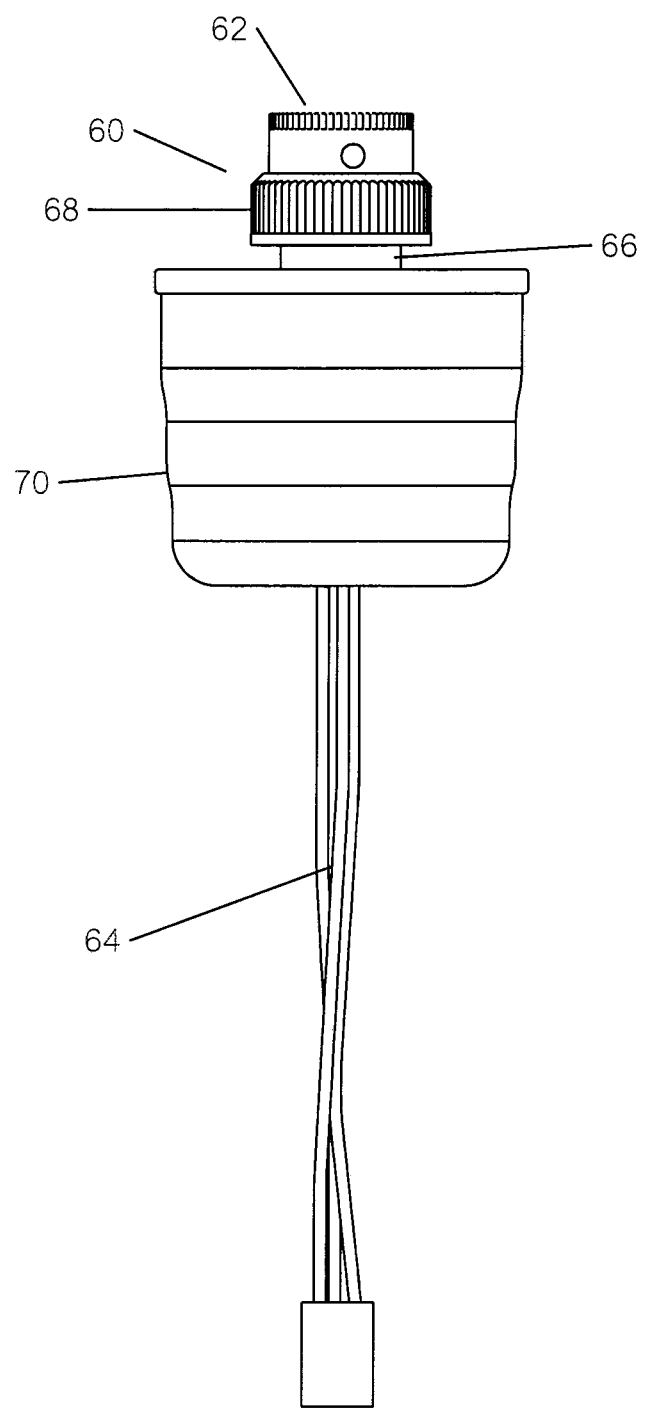
FIGS. 9A-9E illustrate a fluid resistant backshell sealant and a method for encapsulating part or all of a space within a boot, the boot surrounding all or part of the backshell and some of the wires as well.
Figure 9B:
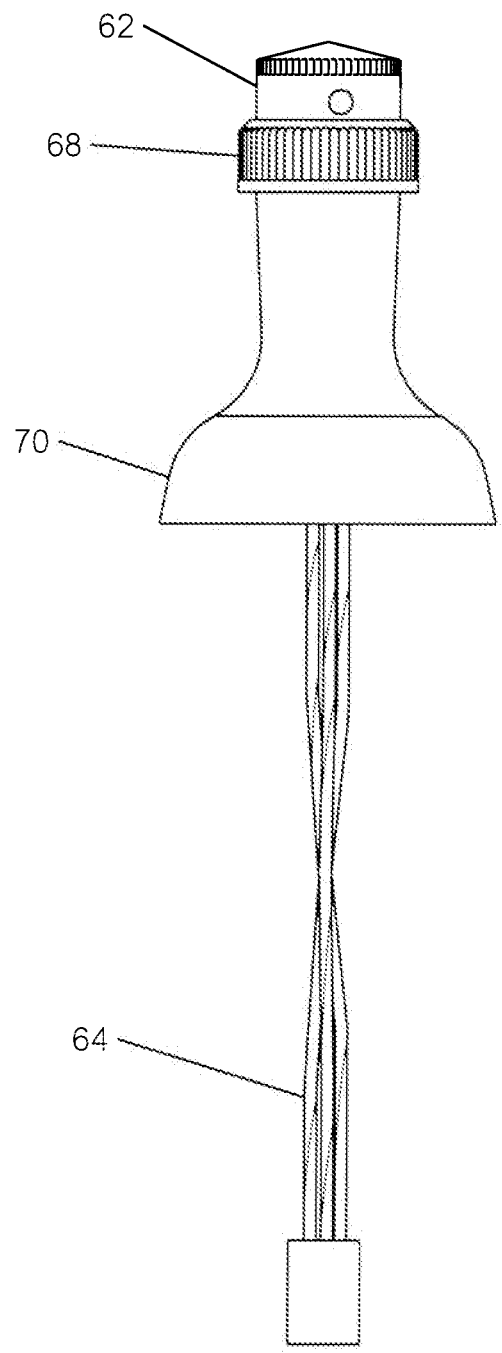
Figure 9C:
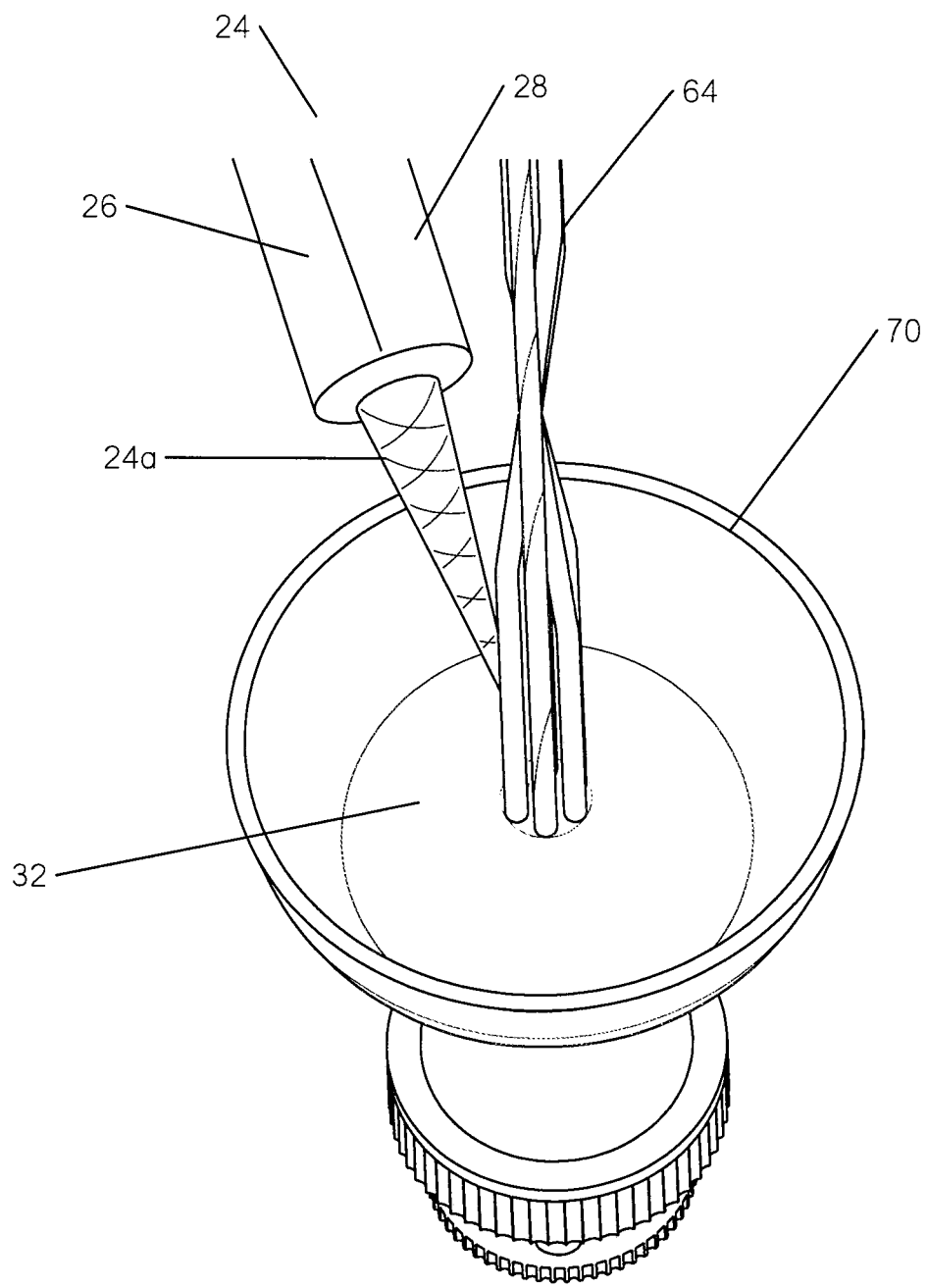
Figure 9D:
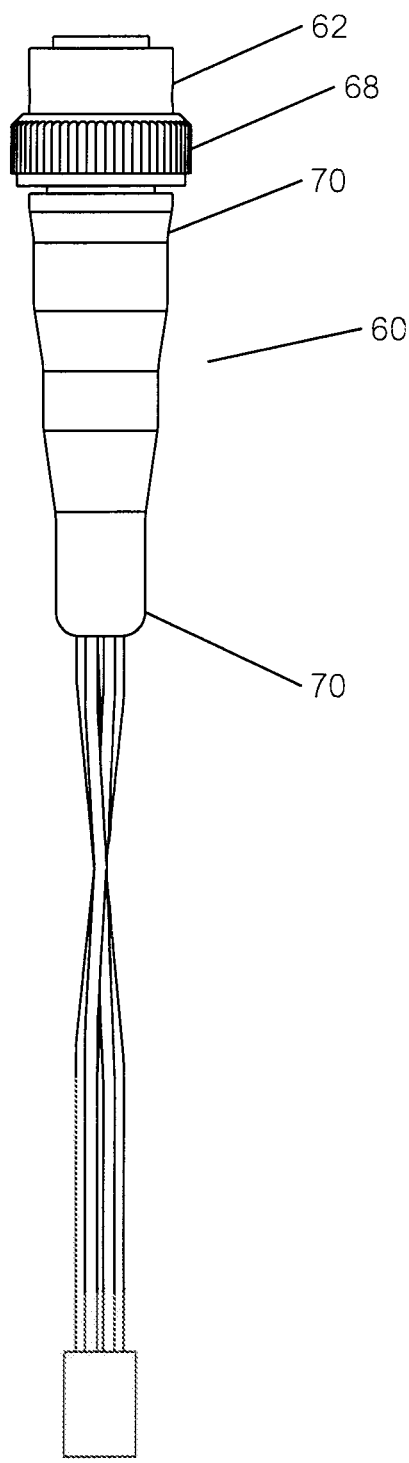
Figure 9E:
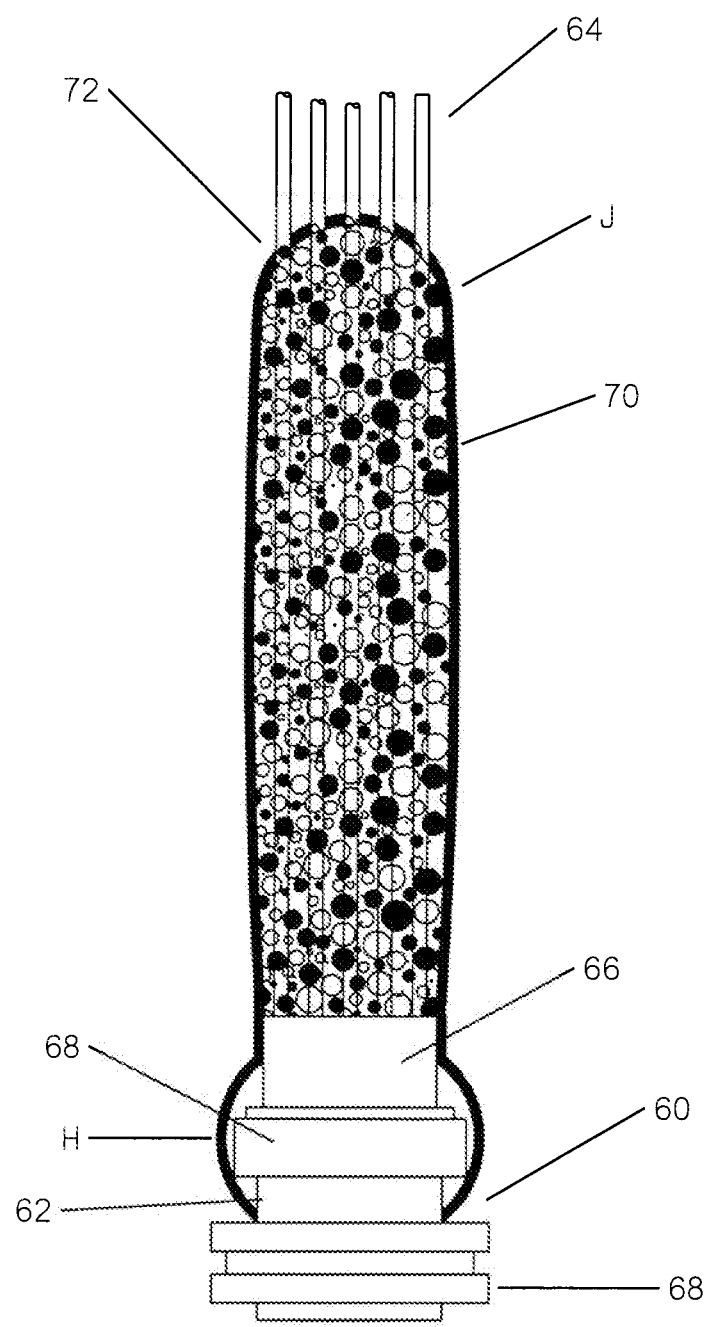

FIGS. 9-9E illustrate the use of two part, cure in place TS1228 in a cable and connector assembly 60. A method set forth herein describes the installation in an aircraft for use with injectable sealant TS1228 or SF2470, including fluid resistance and moisture protection to the connector. Cable and connector assemblies are used in a number of environments, including carrying electrical signals in aircraft. Cable and connector assemblies typically include a connector 62, which may be a plug (male) or a receptacle (female) connector, typically having multiple electronically conductive prongs or recesses (not shown), and a cable or a cable bundle 64 comprising multiple wires for connecting to multiple plugs or receptacles for transmitting electrical signals. Typically, a connector backshell 66 is used to help engage the cable or cable bundle to the connector. Connector backshell 66 has components specifically designed to be placed around that portion of a connector (plug or receptacle) which contains the facilities for attaching wires or cables. Backshell 66 is used to shield the wire connection points having interconnecting cable and a connector. Some backshells may include a cable clamp to secure the cable to the backshell and the connector. Backshells 66 may be used with any type of connector to protect the cable connections and to provide strain relief to the solder joints. Backshells may be straight, 45° or 90° as required by the design. Illustrated is a straight backshell 66, which includes a coupling ring 68 that may threadably couple the connector 62 to matching male or female connection (not shown). A molded boot 70 may be provided, such as an AvDEC feet shrink molded boot. Molded boots are available from many different sources and may be, as here, heat shrinkable to provide environmental protection to the coupling.

Following the method set below, it is seen in FIGS. 9C and 9E that boot 70, covering at least the upper part of the cable and connector assembly, may be at least partially filled with fluid resistant sealant 72, such as TS1228 or SF2470 as set forth herein, which will cure to provide a tough, hard, durable environmental sealant for providing resistance to fluids as set forth herein.

The surfaces should be cleaned with a clean cloth moistened with a cleaning solvent, such as isopropyl alcohol. Surfaces should be free of dirt, oil, grease, and other contamination prior to boot installation, including the cable, the connector, and the backshell.

The ends of molded boot 70 are labeled H (and lower) and J (upper). Slide the boot "J" end first over the electrical connector. Ensure that "H" end is facing the connector. Heat the "H" end of the boot with a hot air tool capable of producing sufficient heat to fully recover (shrink) the boot. The boot should be located and shrunken uniformly around the connector backshell, (leaving typically at least the lower part of the connector and the coupling ring uncovered) and only until it shrinks uniformly around the backshell. With the assembly held vertical, apply heat to the "J" end of the boot, moving up from "H" end. The molded boot may be removed by disconnecting the receptacle and plug and scoring the surface of the molded boot and concentrating the heat on the scored line. The boot should begin to separate along the line after which it can be peeled off. Injectable assembly 24 should be held firmly in place above the annulus around the cables or wires while forcing element 29 urges uncured mix 32 into the void. When cured, it will help create a moisture barrier between the regular surfaces and providing corrosion protection.

A sealant is provided for gasket, tape and injectable, where hardness is not needed but tackiness is, the sealant comprising soft gel in a tape, injectable or gasket, the gel with resistance to at least one of the three types of hydraulic fluid as well as Jet A fuel. In the form of a stretchable tape as illustrated in FIGS. 10, 10A-C, the tape may be to wrap cable connectors where they are in close proximity to hydraulic fluids. This two part polyurethane gel is available from KBS, Dodd City, Tex. U/1020/P1021 and when cured is tacky and soft, between 30-150 measured with a 35 gram half cone penetrometer. They may also be used in conjunction with injectables. See FIG. 10A.

Figure 10:
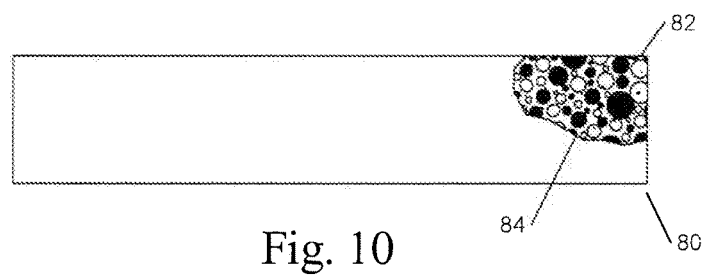
FIG. 10 illustrates a stretchable tape with aircraft fluid resistance for wrapping electrical connectors.
Figure 10A:
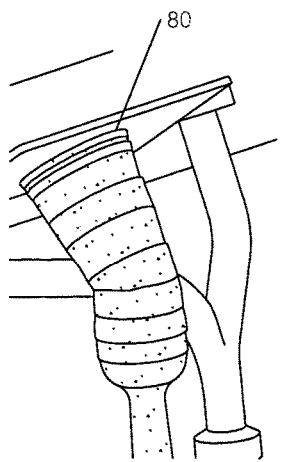
FIGS. 10A, 10B, and 10C illustrate a stretchable aircraft fluid resistant tape used to wrap cable and cable connectors.
Figure 10B:
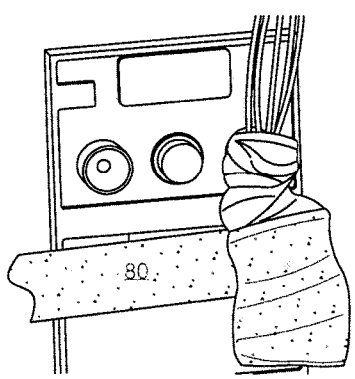
Figure 10C:
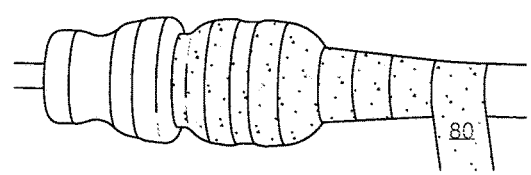

FIG. 10 illustrates a stretchable, fluid resistant tape 80 that contains a cured mix 82 of U1020/P1021. This foam is at least partially or fully opened cell foam 84. It is resistant to hydraulic fluids, such as Aeroshell 31 (a synthetic hydrocarbon hydraulic fluid).

The gel, when subject to submersion in Aeroshell 31 showed the following results: 24 hours/1.7% weight gain; 48 hours/2.9% weight gain; 72 hours/3.9% weight gain; 5 days/5.2% weight gain; 10 days/5.4% weight gain; 20 days/5.5% weight gain; and, 32 days/5.5% weight gain. A weight gain of less than 10% for 24 hour immersion of the gel may be considered hydraulic fluid resistant, synthetic hydrocarbon.

Tape is typically provided in a roll and, as set forth herein, may provide some tackiness or stickiness to surface for optimal corrosion protection. It also passes 12 second vertical burn. It may be used with stringers, antennas, door shelves, access panels, windscreen installations, and other suitable locations.

Figure 11:
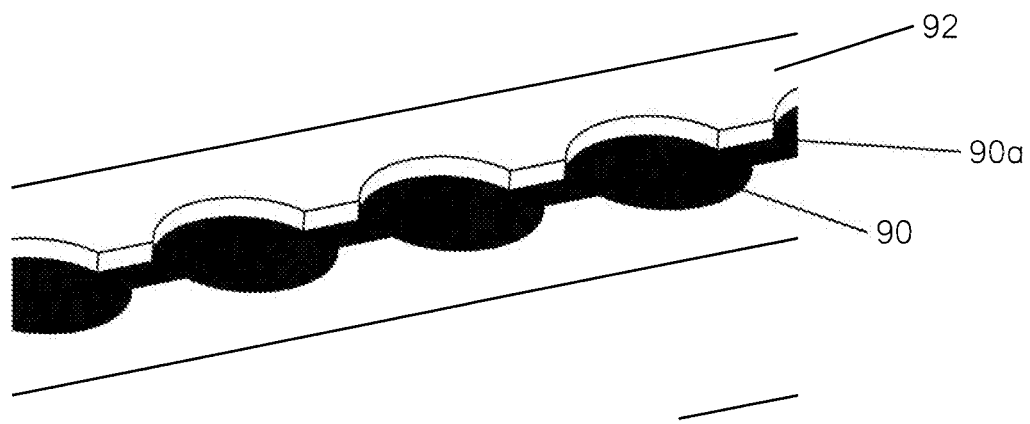
FIG. 11 illustrates a fluid resistant, clear sealant for use in seat tracks of aircraft.
Figure 11A:
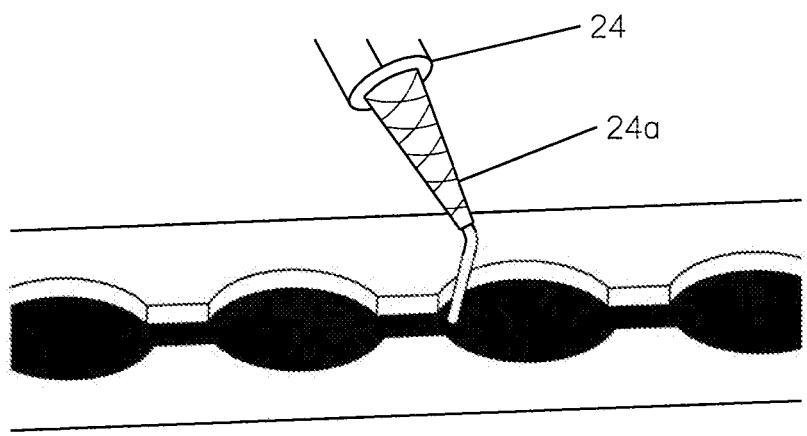
FIGS. 11A and 11B illustrate an aircraft fluid resistant sealant used as a filler in an aircraft seat track.
Figure 11B:
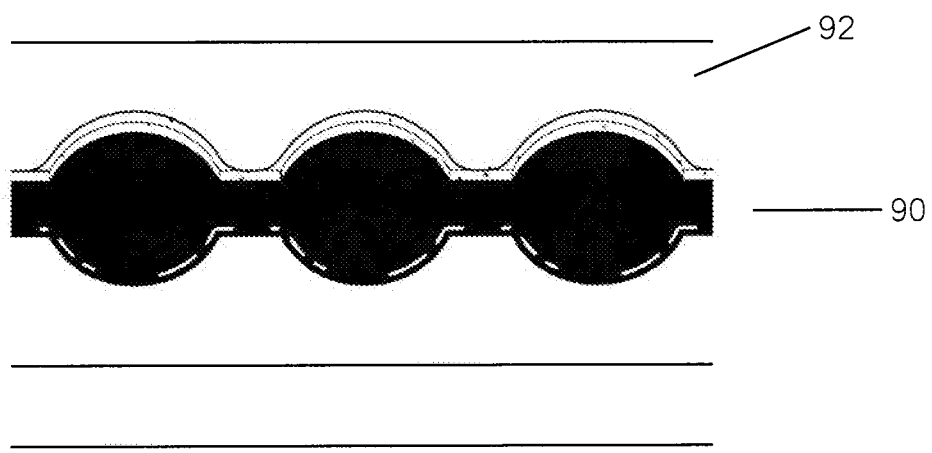

FIGS. 11, 11A, and 11B illustrate a seat track sealant 90 for maintaining the position of a seat in an aircraft interior. Seat track sealant 90 may have an upper surface 90a. An injectable two-art sealant, such as TS1228, may be used in a seat track 92 using injectable 24 to provide a cure in place seat tracker sealant 90 that provides a tough, durable, clear seal that keeps debris from entering the seat track, yet is removable, that is, has low adhesion to the walls of the seat track. In some embodiments, seat track sealant 90 may be filled to the level of top wall 90a. The injectable assembly 24 may be comprised of AvDEC Part No. SF2470, which, while it cures to amber, still retains sufficient clarity that cracks, debris or corrosion beneath the surface of the sealant may be readily identified (visually clear). This product is a two-component polyurea that cures to full cure in less than 4 hours and gels in 8 to 14 minutes. It has a peel strength of between 2 and about 10 piw, and passes salt fog 3000 hr. ASTMB 117, as well as 12 second vertical burn, 14 CFR Part 25 subpart d, Section 25.853, Compartment Interiors, and Section 25.855, Cargo or Baggage Compartments. The material will form a complete environmental seal, but is capable of being cleanly pull out of the track seat application in one piece, yet retains its tensile strength greater than 100 psi (ASTNB 412).

Figure 12:
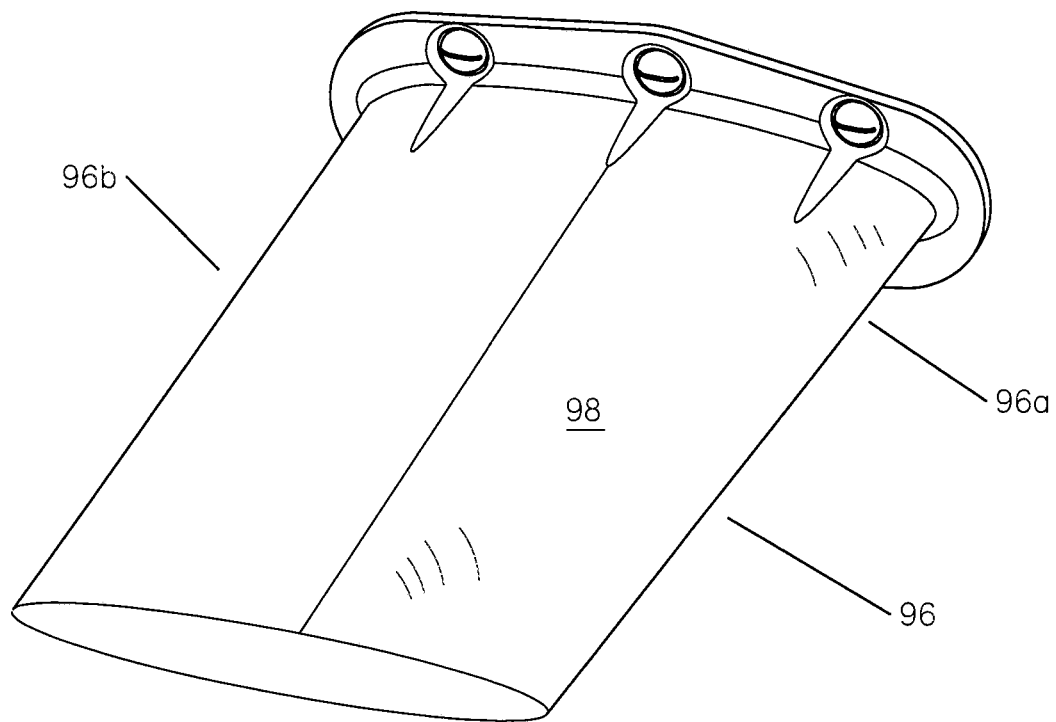
FIG. 12 illustrates an aircraft antenna having an aircraft fluid resistant coating on at least part of a leading edge thereof.

FIG. 12 illustrates an antenna sealant 98 for the exterior of an aircraft, in some cases, an antenna 96 that depends below the fuselage of an aircraft behind at least some of the landing tires. Thus, the antenna may be subject to debris, such as rocks and pebbles, getting kicked up and striking the leading edge, especially when landing on unimproved runways. Applicant provides a two-component polyurethane material in some embodiments, spray or brush on TS1228 that cures smoothly and rigidly to the aircraft surface, including leading edge 96a, and at least part way to trailing edge 96b. Antenna sealant 98 being a two-component material that cures smoothly and rigidly to the surface of the antenna. It creates a watertight seal that can endure the toughest operational environments. Its rigid cure means increased abrasion resistance. It removes easily facilitating quick repair and inspections. In some embodiments, the hardness is in the Shore A range, for example, about 20 to 80, and it cures to full cure in less than 8 hours. The peel strength may be greater than 4 piw, in some embodiments, in the range of 4 to 10 piw. It passes the 12 second vertical burn test as set forth above and 3000 hours soft fog per ASTMB 117.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

TABLE 1

Submersion Test Result

TS1228-Care

| | | | Pre-Test | | | 24 hours | | | 168 Hours | | |
|---|---|---|---|---|---|---|---|---|---|---|---|
| Sample | Fluid Type | Facture Weight (g) | Total Weight (g) | Sample Weight (g) | Change (%) | Total Weight (g) | Sample Weight (g) | Change (%) | Total Weight (g) | Sample Weight (g) | Change (%) |
| 1 | Jet A Fuel | 0.1129 | 23.9631 | 23.8502 | 0% | 24.0871 | 23.9742 | 1% | 24.3557 | 24.2428 | 2% |
| 2 | Autozone Brake Fluid | 0.1041 | 22.5095 | 22.4054 | 0% | 23.2124 | 23.1053 | 3% | 24.3112 | 24.2071 | 8% |
| 3 | StycrolLD-4 | 0.1167 | 21.6004 | 21.4837 | 0% | 23.0662 | 22.9495 | 7% | 25.7519 | 25.6352 | 19% |
| 4 | AGS Silicone Brake Fluid | 0.105 | 22.8783 | 22.7693 | 0% | 12.994 | 22.885 | 1% | 23.0107 | 22.9017 | 1% |
| 5 | Royco 782 | 0.1184 | 21.5808 | 21.5624 | 0% | 21.8689 | 21.7505 | 1% | 21.8248 | 21.7054 | 1% |
| 6 | White Mineral OS | 0.1195 | 23.3362 | 23.2367 | 0% | 23.4525 | 23.333 | 0% | 23.4303 | 23.3108 | 0% |
| 7 | Royal Purple Synthetic | 0.1156 | 21.6241 | 21.5063 | 0% | 22.7459 | 21.6301 | 1% | 21.737 | 21.6212 | 1% |
| 8 | Isopropyl | 0.1196 | 21.3139 | 21.6343 | 0% | 21.585 | 21.8654 | 1% | 22.3207 | 22.2011 | 2% |
| 9 | Denatuced Ethyl | 0.1263 | 22.4003 | 22.274 | 0% | 22.7273 | 22.601 | 1% | 23.4813 | 23.365 | 5% |
| 10 | Sky-Kleen | 0.1184 | 23.1272 | 23.0088 | 0% | 24.3259 | 24.2075 | 3% | 26.6327 | 26.3143 | 13% |
| 11 | Dynalece EG | 0.1168 | 22.5846 | 22.4678 | 0% | 22.7036 | 22.5868 | 1% | 22.6371 | 22.5203 | 0% |
| 12 | Dynalece PG | 0.134 | 22.6515 | 22.5173 | 0% | 22.7645 | 22.6305 | 1% | 22.7245 | 22.5905 | 0% |
| 13 | De-Icing Fluid PA | 0.1219 | 21.1519 | 21.03 | 0% | 21.2707 | 21.1488 | 1% | 21.1833 | 21.0614 | 0% |
| 14 | De-Ionized Water | 0.1198 | 22.2668 | 22.147 | 0% | 22.2387 | 22.1189 | 0% | 22.2398 | 22.12 | 0% |
| 15 | Mobil Aero HF | 0.1264 | 22.235 | 22.1066 | 0% | 22.3495 | 22.2231 | 1% | 22.3943 | 22.2679 | 1% |
| 16 | 5% NaCl Solution | 0.1119 | 23.0594 | 22.5475 | 0% | 23.0781 | 22.9652 | 0% | 23.0756 | 22.5537 | 0% |

TABLE 2

| Test Fluid | Class | % Weight Change (8 hrs) | % Weight Change (16 hrs) | % Weight Change (24 hrs) | Visual Inspection |
|---|---|---|---|---|---|
| Jet A Fuel | Aviation Jet A Fuel | 0.08% | 0.06% | 0.07% | No change |
| AutoZone Brake Fluid | Non-Mineral Based Hydraulic Fluid | 0.30% | 0.47% | 0.64% | No change |
| Skydrol LD-4 | Phosphate Ester-Based Hydraulic Fluid | 0.65% | 1.02% | 1.66% | No change |
| AGS Silicone Brake Fluid | Silicone-Based Hydraulic Fluid | 0.13% | 0.12% | 0.21% | No change |
| Royco 782 | Synthetic Hydrocarbon Based Hydraulic Fluid | 0.11% | 0.12% | 0.22% | No change |
| Mobil Aero HF | Mineral-Based Hydraulic Fluid | 0.16% | 0.20% | 0.17% | No change |
| White Mineral Oil | Mineral-Based Lubricating Oil | 0.23% | 0.09% | 0.18% | No change |
| Royal Purple Synthetic | Ester-Based Lubricating Oil | 0.19% | 0.15% | 0.14% | No change |
| Isopropyl Alcohol | Isopropyl Alcohol Solvent | 0.08% | 0.06% | 0.13% | No change |
| Denatured Ethyl | Denature Alcohol Solvent | 0.03% | 0.03% | 0.06% | No change |
| Sky-Kleen Solvent | N/A | 0.17% | 0.24% | 0.52% | No change |
| Dynalene EG | Ethylene Glycol De-Icing Fluid | 0.24% | 0.15% | 0.18% | No change |
| Dynalene PG | Propylene Glycol De-Icing Fluid | 0.22% | 0.15% | 0.25% | No change |
| De-Icing Fluid Potassium Acetate | N/A | 0.61% | 1.05% | 1.12% | Salt Deposits on sample |
| De-Icing Fluid Potassium Formate | N/A | 0.34% | 0.31% | 0.18% | No change |
| De-Ionized Water | Natural Fluid | 0.07% | 0.04% | 0.05% | No change |

The invention claimed is:

1. An assembly for use with a spray gun, the spray gun for applying a sealant coating, the assembly comprising:
   a first compartment and a second compartment, the first compartment containing a first component, the second compartment containing a second component, the components dimensioned to engage a spray gun, and
   a mixing straw fluidly engaged to the first and second compartments, the mixing straw configured to receive and when the assembly is engaged with the spray gun and the spray gun is energized, combine the first and second components to form an uncured sealant mix and emit the uncured sealant mix, under pressure, from a tip of the mixing straw at a removed end thereof capable of curing to form a visibly clear, cured in place, sealant coat on an aircraft workpiece, the clear sealant coat being one of a polyurea, polyurethane or polyurea/polyurethane hybrid coat;

wherein the cured sealant coat is resistant to a phosphate ester based hydraulic fluid, and also resistant to Jet A fuel; the resistance to the phosphate ester based hydraulic fluid demonstrated by a weight change of 1.66% or less (24-hour spray) and the resistance to the Jet A fuel demonstrated by a weight change of 0.07% or less (24-hour spray).

2. The assembly of claim 1, wherein the sealant coat cures to at least 85% of final hardness in 24 hours or less at 77° and 50% relative humidity.

3. The assembly of claim 1, wherein the sealant coat has a hardness of between 20 and 80 Shore "A".

4. The assembly of claim 1, wherein the cured sealant coat is removable.

5. The assembly of claim 1 wherein the cured sealant coat has a tensile strength of greater than 100 psi.

6. The assembly of claim 1 wherein the cured sealant coat has an elasticity of at least 130%.

7. The assembly of claim 1 wherein the cured sealant coat is between 3 and 60 mil thick.

8. The assembly of claim 1 wherein the cured sealant coat undergoes a tint change during curing.

9. The assembly of claim 1 wherein the cured sealant coat is 3 to 60 mil thick and removable.

10. The assembly of claim 1 wherein the cured sealant coat is 3 to 60 mil thick and has an elasticity of at least 130%.

11. The assembly of claim 1 wherein the cured sealant coat is 3 to 60 mil thick and has a tensile strength of greater than 100 psi.

12. The assembly of claim 1 wherein the sealant coat cures to at least 85% of final hardness in 24 hours or less at 77° and 50% relative humidity and the cured sealant coat is between 3 and 60 mil thick.

13. The assembly of claim 1 wherein the sealant coat cures to at least 85% of final hardness in 24 hours or less at 77° and 50% relative humidity and the sealant coat has a hardness of between 20 and 80 Shore "A".

14. The assembly of claim 1 wherein the sealant coat cures to at least 85% of final hardness in 24 hours or less at 77° and 50% relative humidity, the sealant coat has a hardness of between 20 and 80 Shore "A" and the cured sealant coat is between 3 and 60 mil thick.

15. The assembly of claim 1 wherein the cured sealant coat passes salt fog test (ASTM B117).

16. The assembly of claim 1 wherein the cured sealant coat is flame retardant (12 second vertical burn).

17. The assembly of claim 1 wherein the sealant coat is free of VOCs (Volatile Organic Compounds).

18. The assembly of claim 1 wherein the sealant coat has a peel strength of greater than 4 piw.

19. The assembly of claim 1 wherein the sealant is visually clear when coated to ¼" thickness.

20. The assembly of claim 1 wherein the viscosity of the sealant mix, prior to gelling, is between about 700 and 1200 cps.

* * * * *